(12) United States Patent
Joung et al.

(10) Patent No.: US 12,543,391 B2
(45) Date of Patent: Feb. 3, 2026

(54) IMAGE SENSOR AND MANUFACTURING METHOD OF THE SAME

(71) Applicant: SAMSUNG ELECTRONICS CO., LTD., Suwon-si (KR)

(72) Inventors: Yoongi Joung, Suwon-si (KR); Junghyun Kim, Suwon-si (KR); Gyeongjin Lee, Suwon-si (KR); Junsik Lee, Suwon-si (KR); Jonghoon Park, Suwon-si (KR); Yunki Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 487 days.

(21) Appl. No.: 17/987,172

(22) Filed: Nov. 15, 2022

(65) Prior Publication Data

US 2023/0299096 A1 Sep. 21, 2023

(30) Foreign Application Priority Data

Mar. 21, 2022 (KR) .................. 10-2022-0034939

(51) Int. Cl.
*H10F 39/00* (2025.01)
*H10F 39/12* (2025.01)
*H10F 39/18* (2025.01)

(52) U.S. Cl.
CPC ......... *H10F 39/802* (2025.01); *H10F 39/182* (2025.01); *H10F 39/199* (2025.01);
(Continued)

(58) Field of Classification Search
CPC .... H10F 39/802; H10F 39/199; H10F 39/807; H10F 39/8063; H10F 39/8053;
(Continued)

(56) References Cited

U.S. PATENT DOCUMENTS 9,307,170 B2 4/2016 Numata
9,450,008 B2 9/2016 Kikuchi
(Continued)

FOREIGN PATENT DOCUMENTS

JP 2014-093343 A 5/2014
JP 2015-060855 A 3/2015
(Continued)

*Primary Examiner* — Mouloucoulaye Inoussa
(74) *Attorney, Agent, or Firm* — Muir Patent Law, PLLC

(57) ABSTRACT

An image sensor including a substrate including a first and second surface; a pixel isolation structure penetrating the substrate, arranged in a pixel isolation trench extending from the first to second surface of the substrate, and defining a pixel region; a plurality of sub pixel regions on the pixel region; a plurality of photoelectric conversion regions on the plurality of sub pixel regions; a signal separation structure between the plurality of sub pixel regions, the signal separation structure being in a signal separation trench extending from the second surface of the substrate toward the first surface of the substrate into the substrate; and a micro lens on the second surface of the substrate, the micro lens corresponding to the pixel region, wherein the signal separation structure includes an insulating layer, and the pixel isolation structure includes a conductive layer; and a liner layer between the conductive layer and the substrate.

16 Claims, 38 Drawing Sheets

(52) U.S. Cl.
CPC ..... *H10F 39/8053* (2025.01); *H10F 39/8063* (2025.01); *H10F 39/807* (2025.01)

(58) Field of Classification Search
CPC .. H10F 39/182; H10F 39/803; H10F 39/8023; H10F 39/8027; H10F 39/813; H10F 39/014; H10F 39/80373; H10F 39/12; H10F 39/811; H10F 39/024; H10F 39/805; H10F 39/18; H10F 39/8037; H04N 25/70; H04N 23/12; H04N 25/57; H04N 25/134; H04N 23/84; H04N 25/704; H04N 25/11; H04N 25/78; H04N 25/778; H04N 23/67; H01L 21/76; G02B 7/34

See application file for complete search history.

(56) References Cited

U.S. PATENT DOCUMENTS

| | | | |
|---|---|---|---|
| 9,818,781 | B2 | 11/2017 | Lee et al. |
| 10,014,338 | B2 | 7/2018 | Lee |
| 10,204,943 | B2 | 2/2019 | Suzuki et al. |
| 10,276,612 | B2 | 4/2019 | Kato |
| 10,347,679 | B2 | 7/2019 | Kato et al. |
| 10,998,365 | B2 | 5/2021 | Pyo et al. |
| 2017/0345853 | A1* | 11/2017 | Kato ............... G02B 7/34 |
| 2020/0243578 | A1* | 7/2020 | Pyo ............... H10F 39/8053 |
| 2020/0243579 | A1* | 7/2020 | Pyo ............... H10F 39/813 |
| 2020/0286937 | A1* | 9/2020 | Honda ............. H10F 39/807 |
| 2021/0013249 | A1 | 1/2021 | Yang |
| 2021/0134863 | A1* | 5/2021 | Suzuki ............. H10F 39/807 |
| 2021/0144321 | A1 | 5/2021 | Yamashita et al. |
| 2021/0183920 | A1* | 6/2021 | Lee ............... H10F 39/014 |
| 2021/0375965 | A1* | 12/2021 | Yun ............... H10F 39/8063 |
| 2022/0109012 | A1* | 4/2022 | Moon ............. H10F 39/8053 |
| 2022/0123032 | A1* | 4/2022 | Lee ............... H10F 39/8063 |
| 2022/0368844 | A1* | 11/2022 | Lee ............... H10F 39/8053 |

FOREIGN PATENT DOCUMENTS

| | | |
|---|---|---|
| JP | 2015-228468 A | 12/2015 |
| KR | 1020180136872 A | 12/2018 |
| KR | 1020200095340 A | 8/2020 |

\* cited by examiner

IMAGE SENSOR AND MANUFACTURING METHOD OF THE SAME

CROSS-REFERENCE TO RELATED APPLICATION

This application is based on and claims priority under 35 U.S.C. § 119 to Korean Patent Application No. 10-2022-0034939, filed on Mar. 21, 2022, in the Korean Intellectual Property Office, the disclosure of which is incorporated by reference herein in its entirety.

BACKGROUND

1. Field

Embodiments relate to an image sensor and a manufacturing method thereof.

2. Description of the Related Art

An image sensor, e.g., a complementary metal-oxide semiconductor (CMOS) image sensor, may shoot or capture an image (or images) and may convert the image into an electrical signal, and may be used in general consumer electronic devices, e.g., digital cameras, mobile phone cameras, and portable camcorders, as well as cameras mounted on vehicles, security devices, and robots.

Image sensors have become smaller, and the size of pixels has also decreased.

SUMMARY

The embodiments may be realized by providing an image sensor including a substrate including a first surface and a second surface facing each other; a pixel isolation structure penetrating the substrate, arranged in a pixel isolation trench extending from the first surface to the second surface of the substrate, and defining a pixel region; a plurality of sub pixel regions on the pixel region; a plurality of photoelectric conversion regions on the plurality of sub pixel regions; a signal separation structure between the plurality of sub pixel regions, the signal separation structure being in a signal separation trench extending from the second surface of the substrate toward the first surface of the substrate into the substrate; and a micro lens on the second surface of the substrate, the micro lens corresponding to the pixel region, wherein the signal separation structure includes an insulating layer, and the pixel isolation structure includes a conductive layer; and a liner layer between the conductive layer and the substrate.

The embodiments may be realized by providing an image sensor including a substrate including a first surface and a second surface; a pixel isolation structure in a pixel isolation trench that penetrates the substrate, the pixel isolation structure defining pixel regions and, in a plan view, surrounding each of the pixel regions; a plurality of sub pixel regions on the pixel regions; a plurality of photoelectric conversion regions respectively on the plurality of sub pixel regions; a signal separation structure between the plurality of sub pixel regions on the pixel regions, the signal separation structure being in the pixel isolation trench extending from the second surface of the substrate into the substrate; and a micro lens on the second surface of the substrate, the micro lens corresponding to the pixel regions, wherein the pixel isolation structure includes first pixel isolators apart from each other and extending in a first direction, and second pixel isolators respectively crossing the first pixel isolators, spaced apart from each other, and extending in a second direction, the first pixel isolators include first protrusions protruding toward respective centers of the pixel regions, the first protrusions face the second direction and are spaced apart from each other, the pixel isolation structure includes a conductive layer, and a liner layer between the conductive layer and the substrate, the signal separation structure includes an insulating layer, and the signal separation structure is spaced apart from the pixel isolation structure.

The embodiments may be realized by providing an image sensor including a substrate including a first surface and a second surface, the substrate including first pixel group regions and second pixel group regions, the first pixel group regions being arranged in n rows and m columns and including first pixel regions for sensing a first light, the second pixel group regions being arranged in n rows and m columns and including second pixel regions, and each of the n and the m independently being a natural number of 2 or more; a pixel isolation structure in a pixel isolation trench penetrating the substrate, the pixel isolation structure isolating a plurality of pixel regions; a plurality of sub pixel regions in the substrate on each of the plurality of pixel regions; a plurality of photoelectric conversion regions on each of the plurality of sub pixel regions; a signal separation structure between the plurality of sub pixel regions on the pixel region, the signal separation structure being arranged in the pixel isolation trench extending from the second surface of the substrate into the substrate; and micro lenses respectively on the second surface of the substrate on the plurality of pixel regions, wherein the signal separation structure includes an insulating layer, the pixel isolation structure includes protrusions protruding in a direction vertical to the pixel isolation structure toward respective centers of the pixel regions, the pixel isolation structure includes a conductive layer, and a liner layer between the conductive layer and the substrate, and the signal separation structure is spaced apart from the pixel isolation structure.

BRIEF DESCRIPTION OF THE DRAWINGS

Features will be apparent to those of skill in the art by describing in detail exemplary embodiments with reference to the attached drawings in which:

FIGS. 6A, 7A, 8A, 8B, 8C, 8D, 8E, 8F, and 8G are plan views of portions of an active pixel sensor array of an image sensor, according to embodiments, in which FIG. 6A is an enlarged plan view of a region A of an active pixel sensor array of an image sensor, according to an embodiment of FIG. 5A;

DETAILED DESCRIPTION

Figure 1:
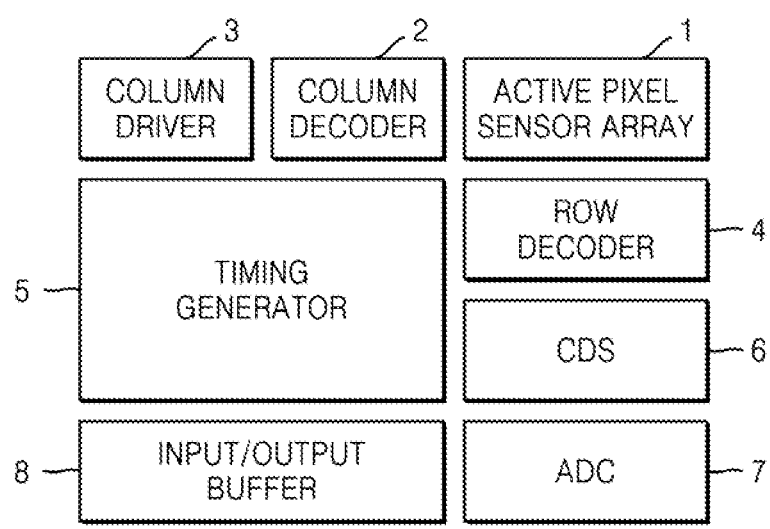
FIG. 1 is a block diagram of an image sensor according to an embodiment.

FIG. 1 is a block diagram of an image sensor according to an embodiment.

Referring to FIG. 1, the image sensor may include an active pixel sensor array 1, a row decoder 2, a row driver 3, a column decoder 4, a timing generator; 5, a correlated double sampler (CDS) 6, an analog to digital converter (ADC) 7, and an input/output (I/O) buffer 8.

The active pixel sensor array 1 may include a plurality of unit pixels, which are two-dimensionally arranged, and convert an optical signal into an electrical signal. The active pixel sensor array 1 may be driven by a plurality of driving signals, such as a pixel selection signal, a reset signal, and a charge transfer signal provided by the row driver 3. In an implementation, the electrical signal may be provided to the CDS 6.

In an implementation, the image sensor may perform an auto focusing operation by using phase difference detection of light incident on the active pixel sensor array 1. Each of the unit pixels of the active pixel sensor array 1 may output a focus signal corresponding to a phase difference of light incident on a pair of photoelectric conversion regions. The focus signal may be used as a signal for adjusting a position of a lens of an image shooting device including an image sensor for performing an automatic focus operation.

The row driver 3 may provide, to the active pixel sensor array 1, a plurality of driving signals for driving a plurality of unit pixels according to a decoding result performed by the row decoder 2. When the unit pixels are arranged in a matrix, the driving signals may be provided for each row.

The timing generator 5 may provide a timing signal and a control signal to the row decoder 2 and the column decoder 4.

The CDS 6 may receive, hold, and sample the electrical signal generated by the active pixel sensor array 1. The CDS 6 may perform double sampling on a particular noise level and a signal level due to the electrical signal, and output a difference level corresponding to a difference between the noise level and the signal level.

The ADC 7 may convert an analog signal corresponding to the difference level output by the CDS 6 into a digital signal, and output the digital signal.

The I/O buffer 8 may latch the digital signal, and the latched digital signal may be sequentially output to an image signal processor according to the decoding result of the column decoder 4.

Figure 2:
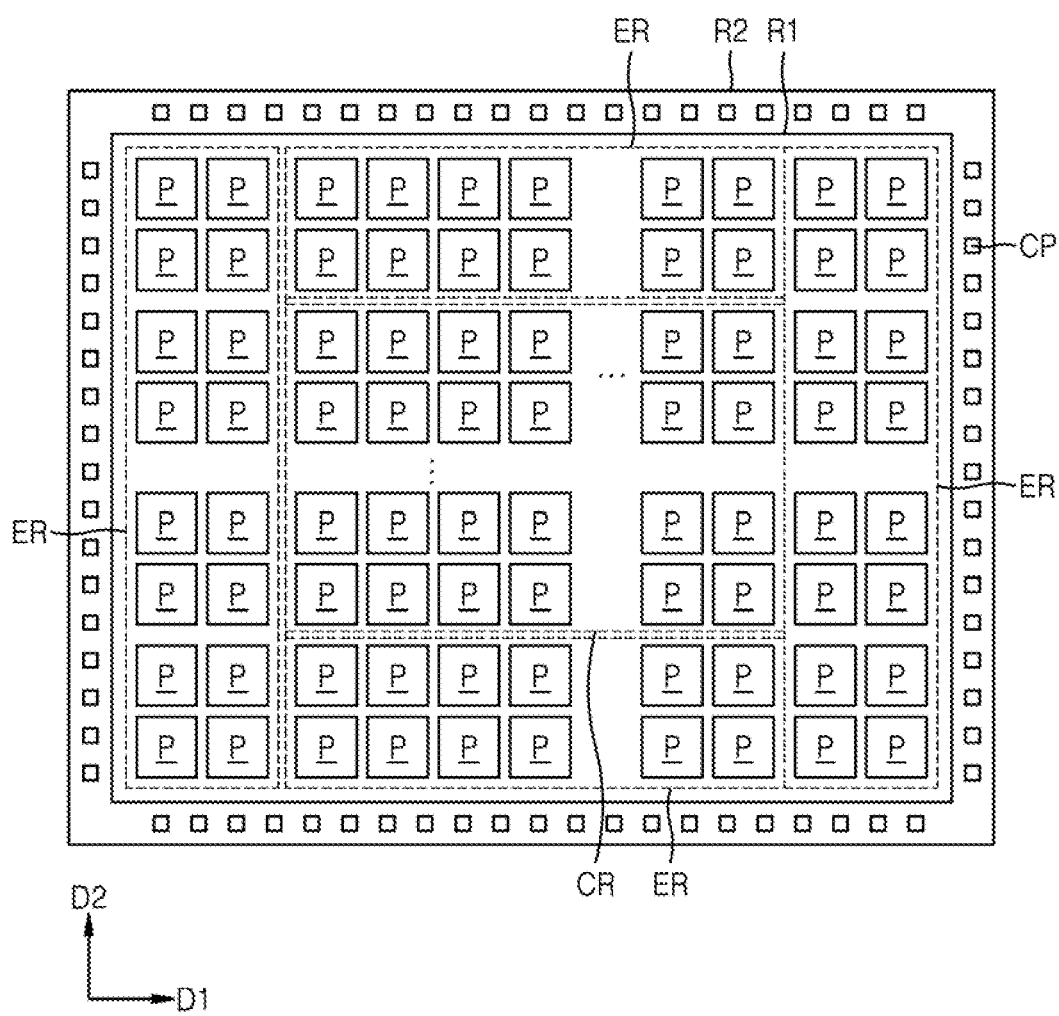
FIG. 2 is a schematic plan view of an image sensor according to an embodiment.

FIG. 2 is a schematic plan view of an image sensor according to an embodiment.

Referring to FIG. 2, the image sensor may include a pixel array region R1 and a pad region R2.

In or on the pixel array region R1, the plurality of unit pixels P, which are two-dimensionally arranged, may be arranged in a first direction D1 and a second direction D2, which cross each other. An electrical signal generated by incident light may be output from each of the plurality of unit pixels P in the pixel array region R1.

The pixel array region R1 may include a central region CR and an edge region ER surrounding the central region CR. In an implementation, the edge regions ER may be arranged on the top and bottom and the left and right sides of the central region CR in a plan view.

On the pad region R2, a plurality of conductive pads CP for inputting and outputting the control signals and photoelectric signals, or the like may be arranged. The pad region R2 may surround the pixel array region R1 in a plan view to facilitate an electrical connection to external elements.

Figure 3A:
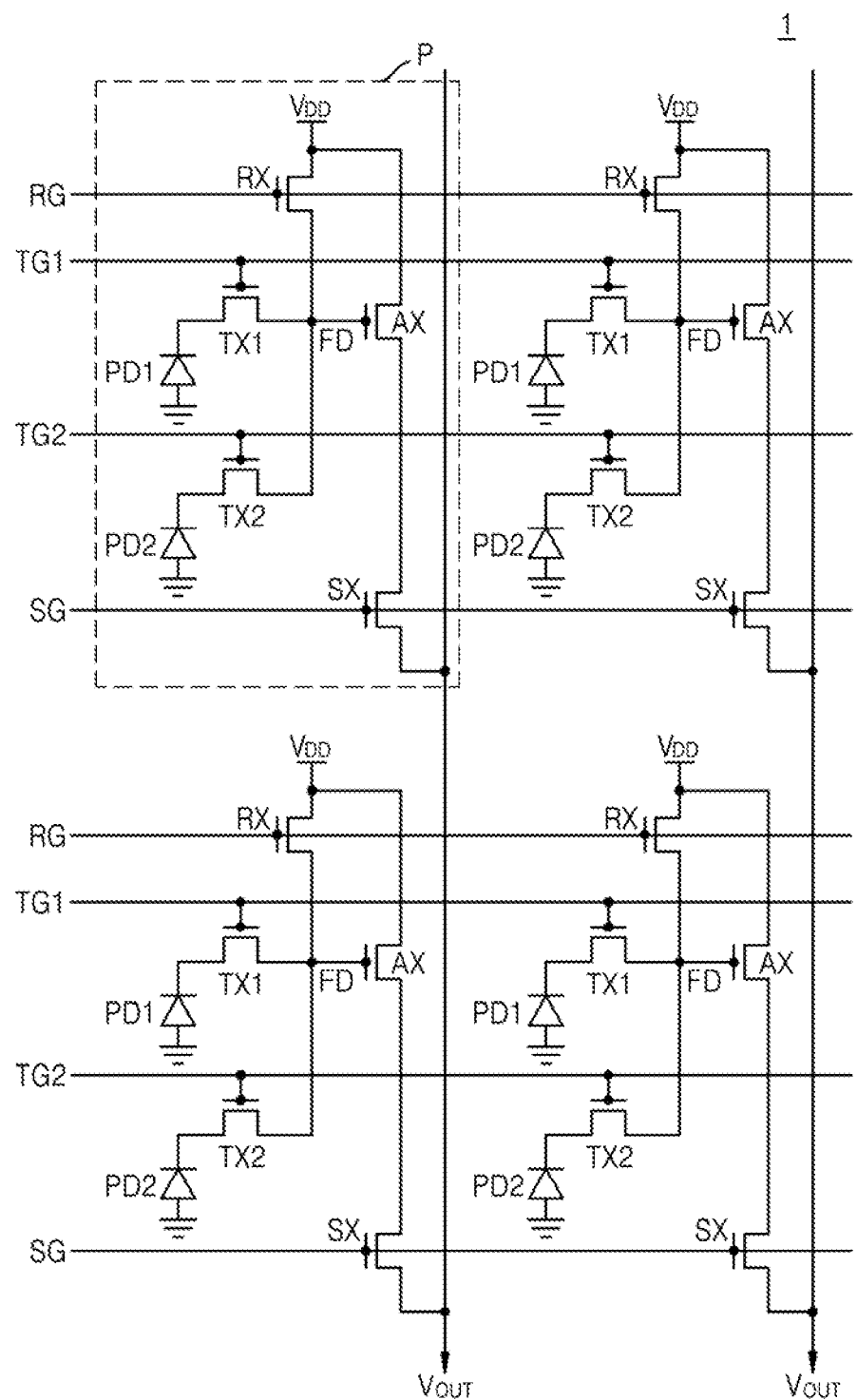
FIGS. 3A and 3B are circuit diagrams of active pixel sensor arrays of an image sensor, according to embodiments.
Figure 3B:
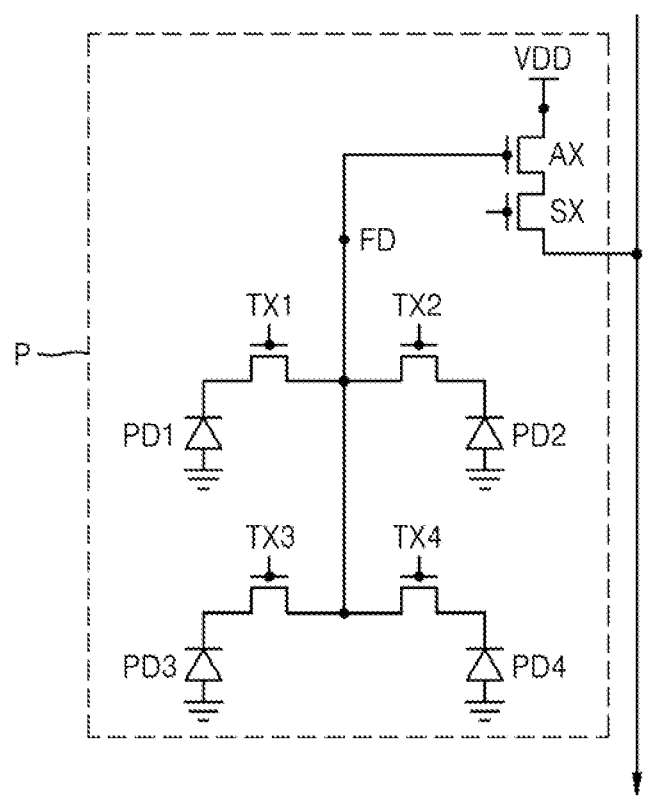

FIGS. 3A and 3B are circuit diagrams of the active pixel sensor array 1 of an image sensor, according to embodiments.

Referring to FIG. 3A, the active pixel sensor array 1 may include the plurality of unit pixels P, and the unit pixels P may be arranged in a matrix in a row direction and a column direction. A unit pixel P may include first and second photoelectric conversion regions PD1 and PD2, transfer transistors TX1 and TX2, and logic transistors RX, SX, and AX. In this case, the logic transistors may include a reset transistor RX, a selection transistor SX, and an amplification transistor AX. Gate electrodes of the first and second transfer transistors TX1 and TX2, the reset transistor RX, and the selection transistor SX may be connected to driving signal lines TG1, TG2, RG, and SG, respectively.

The first transfer transistor TX1 may include a first transfer gate TG1 and may be connected to the first photoelectric conversion region PD1. The second transfer transistor TX2 may include a second transfer gate TG2, and may be connected to the second photoelectric conversion region PD2. In addition, the first and second transfer transistors TX1 and TX2 may share a charge detection node FD, that is, a floating diffusion region.

The first and second photoelectric conversion regions PD1 and PD2 may generate and accumulate photocharges in proportion to an amount of external incident light incident. As the first and second photoelectric conversion regions PD1 and PD2, a photodiode, a photo transistor, a photogate, a pinned photodiode (PPD), and a combination thereof may be used.

The first and second transfer gates TG1 and TG2 may transfer charges accumulated in the first and second photoelectric conversion regions PD1 and PD2 to the charge detection node FD (that is, the floating diffusion region). A complementary signal may be applied to the first and second transfer gates TG1 and TG2. In other words, charges may be transferred from one of the first and second photoelectric conversion regions PD1 and PD2 to the charge detection node FD.

The charge detection node FD may receive and accumulate charges generated in the first and second photoelectric conversion regions PD1 and PD2. The amplification transistor AX may be controlled according to an amount of photocharges accumulated in the charge detection node FD.

The reset transistor RX may periodically reset charges accumulated at the charge detection node FD. A drain electrode of the reset transistor RX may be connected to the charge detection node FD, and a source electrode thereof may be connected to a power voltage VDD. When the reset transistor RX is turned on, the power supply voltage VDD connected to the source electrode of the reset transistor RX may be transferred to the charge detection node FD. Accordingly, the charges accumulated at the charge detection node FD may be discharged when the reset transistor RX is turned on, and thus, the charge detection node FD may be reset.

The amplification transistor AX may amplify a potential change at the charge detection node FD, and output the amplified potential change or a pixel signal via the selection transistor SX to an output line Vout. The amplification transistor AX may be a source follower buffer amplifier, which generates a source-drain current in proportion to an amount of photocharge input to the gate electrode of the amplification transistor AX. A gate electrode of the amplification transistor AX may be connected to the charge detection node FD, a drain electrode of the amplification transistor AX may be connected to the power supply voltage VDD, and a source electrode of the amplification transistor AX may be connected to a drain of the selection transistor SX.

The selection transistor SX may select the unit pixels P to be read in units of rows. When the selection transistor SX is turned on, the power supply voltage VDD connected to the drain electrode of the amplification transistor AX may be transferred to the drain electrode of the selection transistor SX.

Referring to FIG. 3B, the unit pixel P may also include first through fourth photoelectric conversion regions PD1 through PD4 and first through fourth transfer transistors TX1 through TX4 connected thereto, respectively. The first through fourth transfer transistors TX1 through TX4 may share the charge detection node FD, and charges may be transferred from any one of the first through fourth photoelectric conversion regions PD1 through PD4 to the charge detection node FD.

Figure 4A:
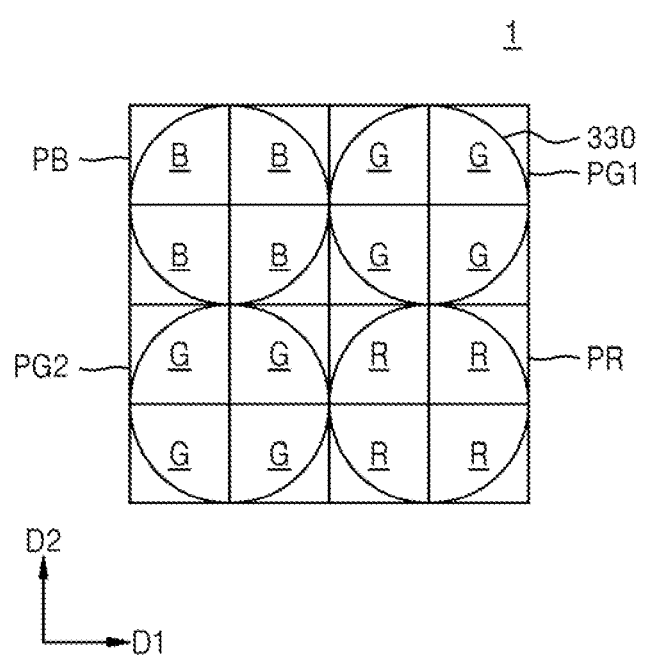
FIGS. 4A and 4B are plan views of color filter arrays of an image sensor, according to embodiments.
Figure 4B:
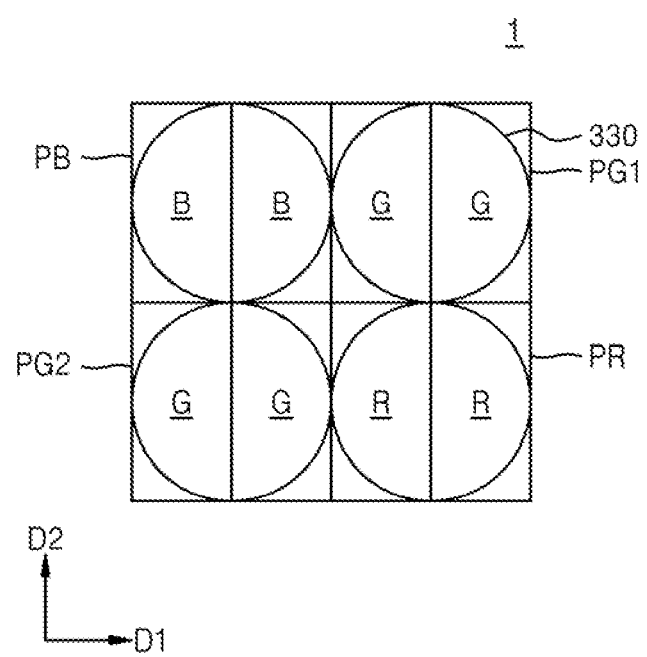

FIGS. 4A and 4B are plan views of color filter arrays of an image sensor, according to embodiments.

Referring to FIG. 4A, in the active pixel sensor array 1, color filters may be arranged to correspond to each of a plurality of pixel regions PB, PG1, PG2, and PR. Each of the plurality of pixel regions PB, PG1, PG2, and PR may include any one of red, green, and blue color filters R, G, and B. In an implementation, each of the plurality of pixel regions PB, PG1, PG2, and PR may include a red pixel including the red color filter R, a blue pixel including the blue color filter B, and a green pixel including the green color filter G. In the red pixel, the red color filter R may pass red light of visible light, and a photoelectric conversion region of the red pixel may generate photoelectrons corresponding to the red light. In the blue pixel, the blue color filter B may pass blue light of the visible light, and the photoelectric conversion region of the blue pixel may generate photoelectrons corresponding to the blue light. In the green pixel, the green color filter G may pass green light of the visible light, and the photoelectric conversion region of the green pixel may generate photo electrons corresponding to the green light. In an implementation, the unit pixels P of the active pixel sensor array 1 may include magenta (Mg), yellow (Y), and cyan (Cy) color filters.

In an implementation, the color filters R, G, and B may be arranged in a Bayer pattern type, in which the number of green color filters G is twice the number of red color filters R or the number of blue color filters B. In the Bayer pattern, the color filters R, G, and B arranged in a 2×2 matrix may constitute one color filter group, and one color filter group may include two green color filters G arranged in a diagonal direction to each other, and the blue and red color filters R and B arranged in a diagonal direction to each other. In an implementation, each of the red and blue color filters R and B may be between adjacent green color filters G. The color filter groups of the Bayer pattern type may be repeatedly arranged in the first direction D1 and the second direction D2.

Micro lenses 330 may correspond to or be on each of the plurality of pixel regions PB, PG1, PG2, and PR. In an implementation, one pixel area PB, PG1, PG2, or PR may correspond to one micro lens 330.

In an implementation, as illustrated in FIG. 4A, there may be four color filters in one pixel region, or there may be two color filters in one pixel region as illustrated in FIG. 4B. In an implementation, in FIG. 4A, there may be four photoelectric conversion regions in one pixel region, and in FIG. 4B, there may be two photoelectric conversion regions in one pixel region.

Figure 5A:
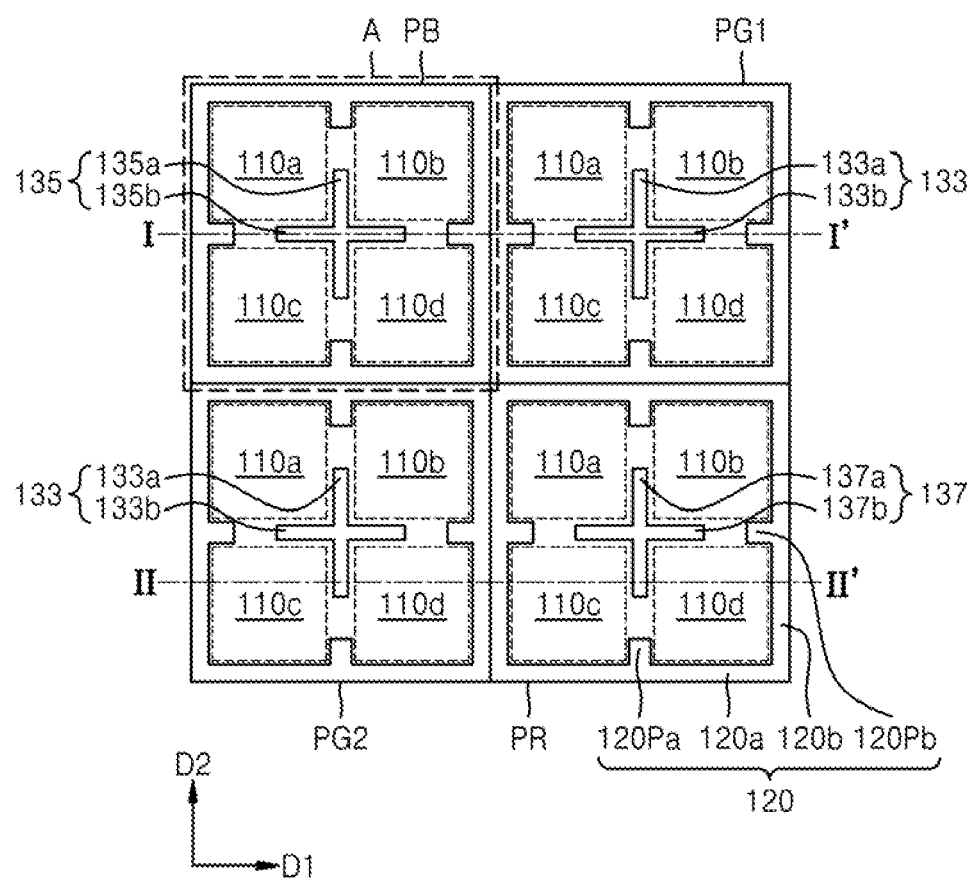
FIG. 5A is a plan view of an active pixel sensor array of an image sensor, according to an embodiment.
Figure 5B:
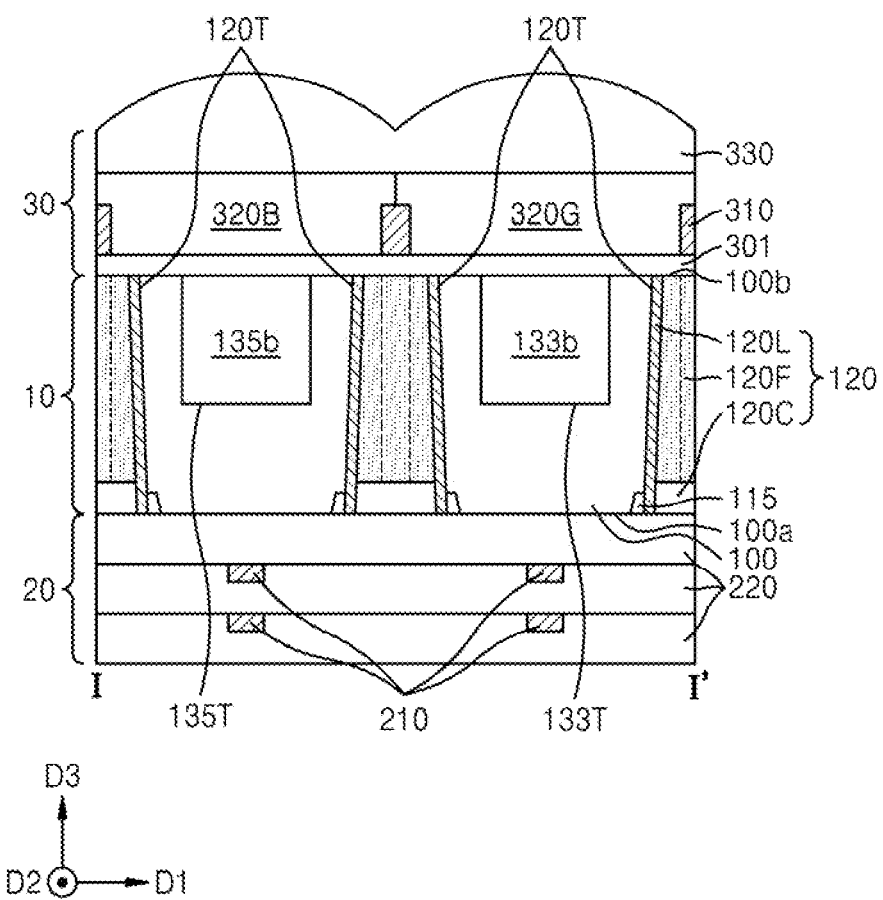
FIGS. 5B and 5C are cross-sections of an active pixel sensor array of an image sensor, according to embodiments, and illustrate cross-sections taken along lines I-I' and II-II' in FIG. 5A, respectively.
Figure 5C:
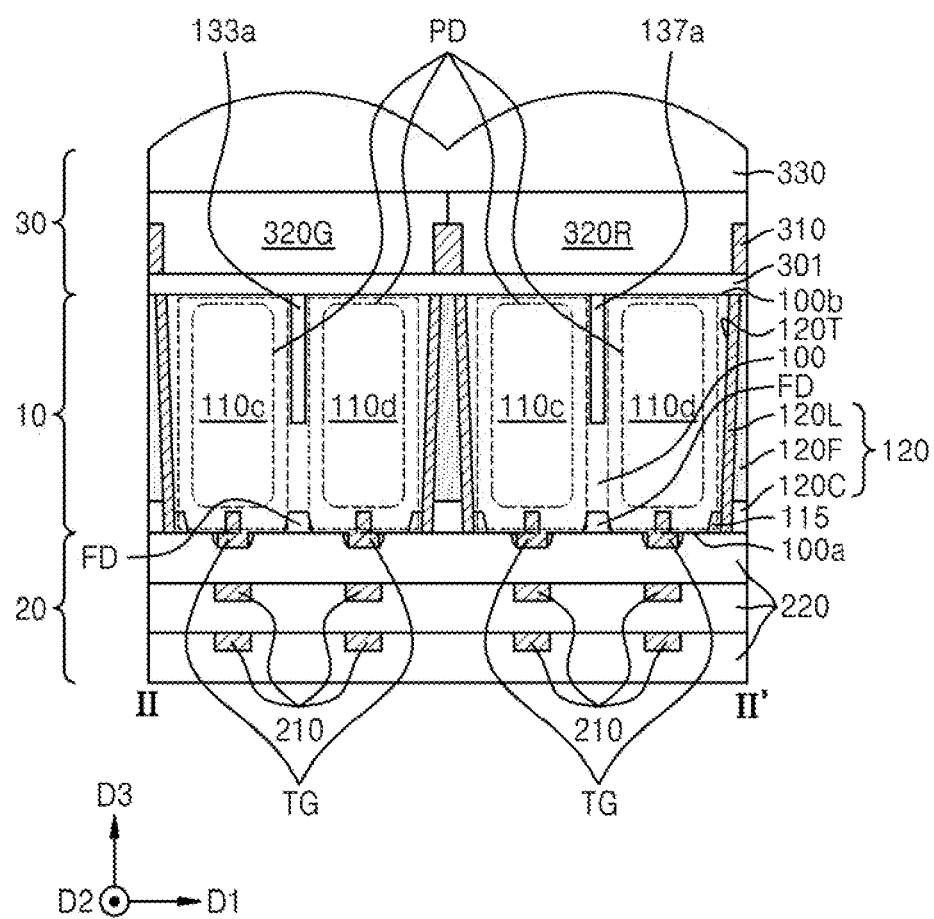
Figure 6A:
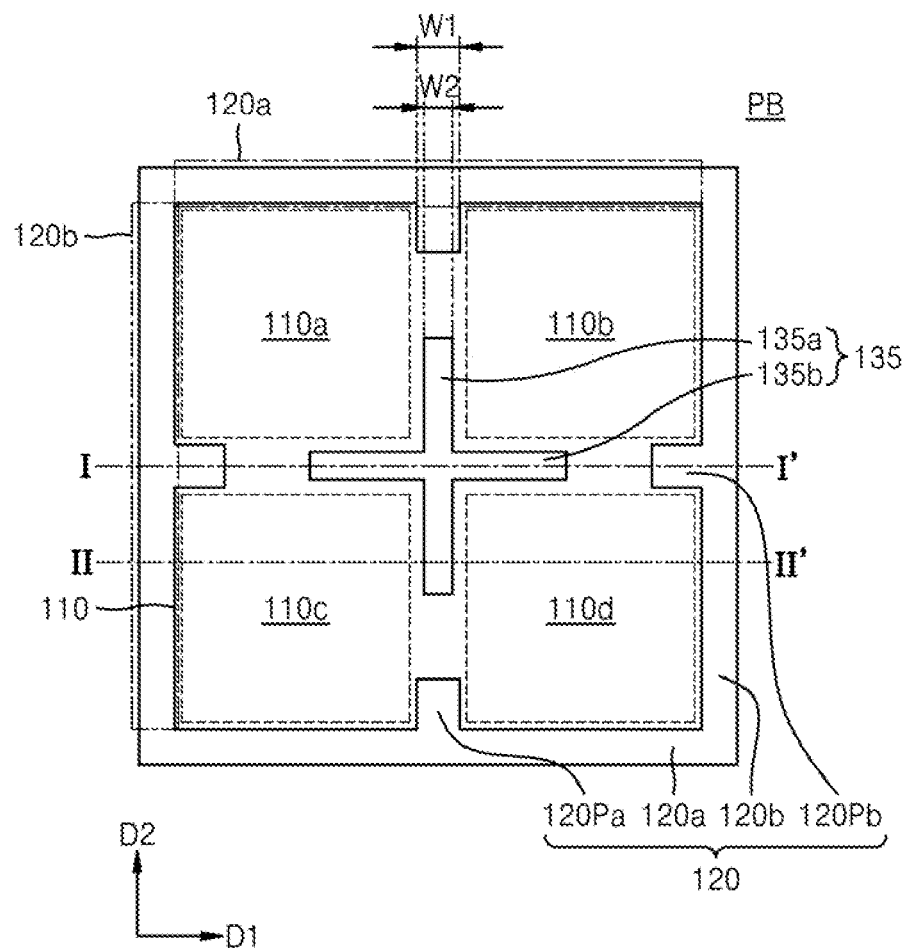
Figure 6B:
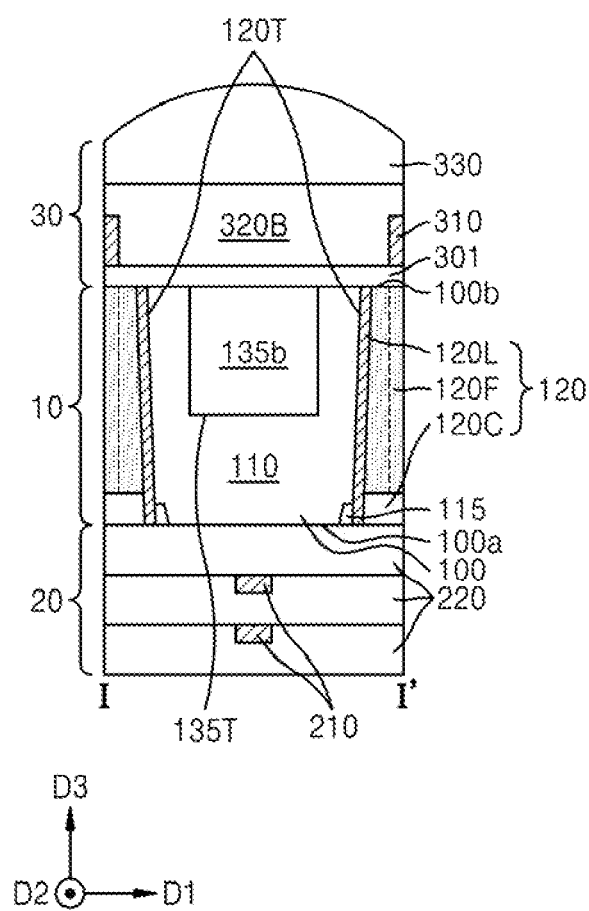
FIGS. 6B and 6C are cross-sectional views of an active pixel sensor array of an image sensor, according to embodiments, taken along lines I-I' and II-II' in FIG. 6A, respectively.
Figure 6C:
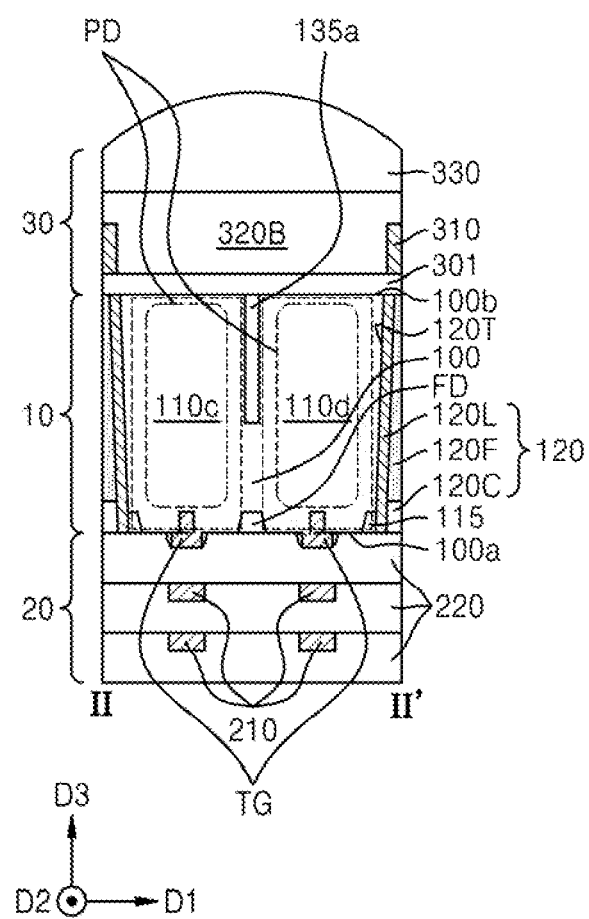

FIG. 5A is a plan view of an active pixel sensor array of an image sensor, according to an embodiment. FIGS. 5B and 5C are cross-sections of an active pixel sensor array of an image sensor, according to embodiments, and illustrate cross-sections taken along lines I-I' and II-II' in FIG. 5A, respectively. FIG. 6A is an enlarged view of portion A in FIG. 5A. FIGS. 6B and 6C are cross-sections taken along line I-I' and line II-II' in FIG. 6A, respectively.

Referring to FIGS. 5A through 5C and 6A through 6C, the image sensor according to embodiments may include a photoelectric conversion layer 10, a readout circuit layer 20, and a light transmission layer 30. The photoelectric conversion layer 10 may be between the readout circuit layer 20 and the light transmission layer 30 in a vertical view or direction (e.g., D3).

The photoelectric conversion layer 10 may include a substrate 100, a pixel region 110 in the substrate 100 and defined by a pixel isolation structure, a plurality of sub pixel regions 110a through 110d in the pixel region 110, and a plurality of photoelectric conversion regions PD respectively in or on the plurality of sub pixel regions 110a through 110d. Each of the plurality of photoelectric conversion regions PD may include the first or second photoelectric conversion regions PD1 or PD2 in FIG. 3A. Each of the plurality of photoelectric conversion regions PD may include the first, second, third, or fourth photoelectric conversion region PD1, PD2, PD3, or PD4 in FIG. 3B.

The substrate 100 may have a first surface 100a (or a front surface) and a second surface 100b (or a rear surface) facing each other. In an implementation, the second surface 100b of the substrate 100 may be a light-receiving surface on which light is incident. In an implementation, the image sensor according to some embodiments may include a back side illumination (BSI)-type image sensor.

The plurality of sub pixel regions 110a through 110d may include a plurality of photoelectric conversion regions PD. In an implementation, the plurality of photoelectric conversion regions PD may include impurity regions doped with impurities of a second conductivity type (e.g., n type), which is opposite to the substrate 100 of a first conductivity type.

External incident light may be converted into an electrical signal in the plurality of photoelectric conversion regions PD.

The readout circuit layer 20 may be on the first surface 100a of the substrate 100. The readout circuit layer 20 may include readout circuits (e.g., metal-oxide semiconductor (MOS) transistors) connected to the photoelectric conversion layer 10. The electrical signal converted in the photoelectric conversion layer 10 may be signal-processed by the readout circuit layer 20. The MOS transistors and conductive lines 210 respectively connected to the MOS transistors may be on the first surface 100a of the substrate 100. The conductive lines 210 may be stacked with interlayer insulating layers 220 therebetween, and the conductive lines 210 at different levels may be connected to each other via contact plugs.

The light transmission layer 30 may be on the second surface 100b of the substrate 100. The light transmission layer 30 may include a color filter array and a micro lens array. The light transmission layer 30 may collect and filter external incident light, and may provide the collected and filtered light to the photoelectric conversion layer 10.

The color filter array may include a red color filter 320R, a green color filter 320G, and a blue color filter 320B. In an implementation, the color filter array may also include other color filters of colors, such as cyan, magenta, or yellow. In an implementation, the color filter array may include an infrared filter.

The micro lens array may include a plurality of micro lenses 330 for condensing external incident light. The micro lenses 330 may be two-dimensionally arranged in the first and second directions D1 and D2 crossing each other, in a plan view. The micro lenses 330 may respectively correspond to the pixel regions 110.

The substrate 100 may include a semiconductor substrate. In an implementation, the substrate 100 may include bulk silicon or a silicon-on-insulator (SOI). In an implementation, the substrate 100 may include a silicon substrate, or may include other materials, e.g., silicon germanium, indium antimony, a lead telluride compound, indium arsenide, indium phosphide, gallium arsenide, or gallium antimony. In an implementation, the substrate 100 may also include an epitaxial layer formed on the base substrate. As used herein, the term "or" is not an exclusive term, e.g., "A or B" would include A, B, or A and B.

In an implementation, the substrate 100 may include a substrate, in which an epitaxial layer of a first conductive type (e.g., p-type) is formed on a bulk silicon substrate of a first conductive type (e.g., p-type), and may include a substrate, in which the bulk silicon substrate has been removed and only the p-type epitaxial layer remains in a fabrication process of an image sensor.

The substrate 100 may include the pixel region 110 defined by a pixel isolation structure 120 and the plurality of sub pixel regions 110a, 110b, 100c, and 110d arranged in the pixel region 110. The plurality of sub pixel regions 110a, 110b, 100c, and 110d may be arranged in a matrix in the first direction D1 and the second direction D2 crossing each other.

FIGS. 5A through 5C, FIGS. 6A through 6C, FIGS. 7A, 7B, 8A, 8B, and FIGS. 9A through 9D illustrate an active pixel sensor array, in which a plurality of sub pixel regions, such as a first sub pixel region 110a, a second sub pixel region 110b, a third sub pixel region 110c, and a fourth sub pixel region 110d, are arranged in the pixel region 110, and FIGS. 8A through 8C and 9E through 9I illustrate an active pixel sensor array, in which a plurality of sub pixel regions, such as the first sub pixel region 110a and the second sub pixel region 110b, are arranged in the pixel region 110.

In FIGS. 5A through 5C, 6A through 6C, 7A, 7B, 8A, 8B, and 9A through 9D, the first through fourth sub pixel regions 110a, 110b, 100c, and 110d arranged in the pixel region 110 may be arranged in a 2×2 matrix in the first direction D1 and the second direction D2 crossing each other in a plan view.

In FIGS. 8C through 8G and 9E through 9I, the first and second sub pixel regions 110a and 110b arranged in the pixel region 110 may be arranged in a line in the first direction D1 or the second direction D2.

In an implementation, the plurality of pixel regions 110 may include first pixel regions PG1 and PG2, a second pixel region PB, and a third pixel region PR, and light beams having different wavelength may be incident on each of the first pixel regions PG1 and PG2, and the second and third pixel region PB and PR.

In an implementation, each of the first pixel regions PG1 and PG2 may be adjacent to the second and third pixel regions PB and PR respectively in the first direction D1 and the second direction D2. The first pixel regions PG1 and PG2 may be arranged in a diagonal direction to each other. The second pixel region PB may be adjacent to the first pixel regions PG1 and PG2 in the first direction D1 and the second direction D2, and the third pixel region PR may be adjacent to the first pixel regions PG1 and PG2 in the first direction D1 and the second direction D2. A light beam of a first wavelength band may be incident on the first pixel regions PG1 and PG2, and a light beam of a second wavelength band that is less than the first wavelength band may be incident on the second pixel region PB. A light beam of a third wavelength band that is longer than the first wavelength band may be incident on the third pixel region PR. In an implementation, the green light may be incident on the first pixel regions PG1 and PG2, the red light may be incident on the second pixel region PB, and the blue light may be incident on the third pixel region PR.

In an implementation, a portion of the active pixel sensor array of an image sensor, as illustrated in FIGS. 6A, 7A, 8A through 8G, and 9A through 9I, may be the second pixel region PB, or may be the first pixel regions PG1 and PG2 or the third pixel region PR.

The pixel isolation structure 120 may surround each of the pixel regions 110 in a plan view. As illustrated in FIG. 6A, the pixel isolation structure 120 may include a plurality of first pixel isolators 120a extending (e.g., lengthwise) in parallel with each other in the first direction D1 and spaced apart from each other in the second direction D2, and a plurality of second pixel isolators 120b crossing the plurality of first pixel isolators 120a, extending (e.g., lengthwise) in parallel with each other in the second direction D2 and spaced apart from each other in the first direction D1. An isolation distance between the first pixel isolators 120a may be substantially the same as an isolation distance between the second pixel isolators 120b.

Each of the first through third pixel regions PG1, PG2, PB, and PR may be defined by a pair of first pixel isolators 120a and a pair of second pixel isolators 120b. In an implementation, the width of each of the first through third pixel regions PG1, PG2, PB, and PR may correspond to an isolation distance between the first pixel isolators 120a adjacent to each other or an isolation distance between the second pixel isolators 120b adjacent to each other.

The pixel isolation structure 120 may be between the plurality of pixel regions PB, PG1, PG2, and PR. The pixel isolation structure 120 may physically and electrically isolate one of the plurality of pixel regions PB, PG1, PG2, and PR from another adjacent one of the plurality of pixel regions PB, PG1, PG2, and PR, e.g., may physically and electrically isolate the first pixel region PG1 from the second pixel region PB. The pixel isolation structure 120 may be arranged in a mesh shape or a grid shape in a plan view. In an implementation, the pixel isolation structure 120 may extend between the plurality of pixel regions PB, PG1, PG2, and PR. In an implementation, the pixel isolation structure 120 may extend between the first pixel regions PG1 and PG2 and the second pixel region PB, and between the first pixel regions PG1 and PG2 and the third pixel region PR.

The pixel isolation structure 120 may be in a pixel isolation trench 120T penetrating the substrate 100. The pixel isolation structure 120 may penetrate the substrate 100 in a third direction D3. In an implementation, the pixel isolation structure 120 may extend from the first surface 100a to the second surface 100b of the substrate 100. The pixel isolation structure 120 may be of a front deep trench isolation (FDTI) type.

The pixel isolation structure 120 may penetrate the substrate 100, and the thickness of the pixel isolation structure 120 in the third direction D3 may also be substantially the same as the thickness of the substrate 100 in the third direction D3. The pixel isolation structure 120 may have a first width adjacent to the first surface 100a of the substrate 100, the first width may be greater than a second width adjacent to the second surface 100b of the substrate 100, and the width of the pixel isolation structure 120 may gradually decrease from the first surface 100a of the substrate 100 toward the second surface 100b of the substrate 100.

The pixel isolation structure 120 may help prevent photocharges generated by light incident on each one of the first through third pixel regions PG1, PG2, PB, and PR, from flowing into an adjacent one of the first through third pixel regions PG1, PG2, PB, and PR, due to random drift. In an implementation, the pixel isolation structure 120 may help prevent crosstalk between the first through third pixel regions PG1, PG2, PB, and PR, which are adjacent to each other.

In an implementation, an element isolation pattern 115 may be provided. In an implementation, the element isolation pattern 115 may be in a trench, in which a portion of the substrate 100 is recessed. The trench may be recessed from the first surface 100a of the substrate 100. The element isolation pattern 115 may be a shallow trench isolation (STI) layer.

The width of the element isolation pattern 115 in the first direction D1 may be gradually reduced from the first surface 100a of the substrate 100 toward the second surface 100b thereof. The element isolation pattern 115 may overlap the pixel isolation structure 120 in the second direction D2 or the first direction D1. The pixel isolation structure 120 may penetrate the element isolation pattern 115 in the third direction D3. The element isolation pattern 115 may include an insulating material. The element isolation pattern 115 may include, e.g., silicon nitride, silicon oxide, or silicon oxynitride.

The pixel isolation structure 120 may include a liner layer 120L and a conductive layer 120F. The liner layer 120L may be along a sidewall and the bottom surface of the pixel isolation trench 120T. In an implementation, the bottom surface of the pixel isolation trench 120T may be defined as a surface facing the first surface 100a of the substrate 100. The conductive layer 120F may be on the liner layer 120L. In an implementation, each of the conductive layer 120F and the liner layer 120L may penetrate the substrate 100 from the first surface 100a of the substrate 100 to the second surface 100b of the substrate 100. The liner layer 120L may be between the substrate 100 and the conductive layer 120F, and may electrically isolate the conductive layer 120F from the substrate 100.

The liner layer 120L may include an oxide layer having a refractive index less than that of the substrate 100. In an implementation, the liner layer 120L may include, e.g., silicon oxide, aluminum oxide, tantalum oxide, or a combination thereof. The liner layer 120L having a refractive index less than that of the substrate 100 may refract or reflect light obliquely incident on the photoelectric conversion region PD. In an implementation, the liner layer 120L may help prevent photocharges generated in one of the pixel regions PB, PG, and PR by incident light from moving to an adjacent one of the pixel regions PB, PG, and PR, due to random drift. In an implementation, the liner layer 120L may help improve the quality of the image sensor according to some embodiments by improving a light reception rate of the photoelectric conversion region PD.

In an implementation, the conductive layer 120F may include a conductive material. In an implementation, the conductive layer 120F may include, e.g., polysilicon. In an implementation, a negative voltage may be applied to the conductive layer 120F including a conductive material. Accordingly, an electrostatic discharge (ESD) bruise defect of an image sensor according to some embodiments may be effectively prevented. In this case, the ESD bruise defect may be referred to as a phenomenon, in which stains, such as bruises, are generated on the generated image by accumulating charges generated by ESD or the like on a surface (e.g., the second surface 100b) of the substrate.

In an implementation, the pixel isolation structure 120 may further include a capping layer 120C. The capping layer 120C may be on the conductive layer 120F. The capping layer 120C may include an insulating material. In an implementation, the capping layer 120C may include a silicon insulation material (e.g., silicon nitride, silicon oxide, or silicon oxynitride) or a high dielectric material (e.g., hafnium oxide or aluminum oxide).

The pixel isolation structure 120 may be formed by using the following process. In an implementation, a portion of the substrate 100 may be removed from the first surface 100a of the substrate 100 to form an element isolation trench, and an insulating material may be used to form the element isolation pattern 115 in the element isolation trench. Thereafter, by forming the pixel isolation trench 120T by removing a portion of the substrate 100 from the first surface 100a of the substrate 100, sequentially forming the liner layer 120L and the conductive layer 120F in the pixel isolation trench 120T, and removing portions of the liner layer 120L and the conductive layer 120F on the first surface 100a of the substrate 100 by using a planarization process or the like, the pixel isolation structure 120 may be formed in the pixel isolation trench 120T. In an implementation, a portion of the conductive layer 120F may be etched, and the capping layer 120C may be formed on the conductive layer 120F.

As illustrated in FIGS. 6A through 6C, the pixel isolation structure 120 may include the first pixel isolators 120a extending in the first direction D1, the second pixel isolators 120b extending in the second direction D2, first protrusions 120Pa protruding from the first pixel isolators 120a in the second direction D2, and second protrusions 120Pb from the second pixel isolators 120b in the first direction D1. In this case, the first and second protrusions 120Pa and 120Pb may locally protrude toward the center of each of the first through third pixel regions PG1, PG2, PB, and PR. In an implementation, the width of the first protrusion 120Pa in the second direction D2 may be less than the width of the second pixel region PB in the second direction D2, or less than the width of the second pixel isolator 120*b* defining the second pixel region PB in the second direction D2. The first and second protrusions 120Pa and 120Pb of the pixel isolation structure 120 may be arranged between first through fourth sub pixel regions 110*a* through 110*d* in each of the first through third pixel regions PG1, PG2, PB, and PR.

The first and second protrusions 120Pa and 120Pb of the pixel isolation structure 120 may help prevent a junction from being degraded between the plurality of photoelectric conversion regions PD inside the plurality of sub pixel regions 110*a* through 110*d* in each of the first through third pixel regions PG1, PG2, PB, and PR, and in a portion adjacent to the pixel isolation structure 120. In an implementation, the first and second protrusions 120Pa and 120Pb of the pixel isolation structure 120 may be capable of physically reflecting incident light at edges of each of the first through third pixel regions PG1, PG2, PB, and PR, and crosstalk between the plurality of photoelectric conversion regions PD in the plurality of sub pixel regions 110*a* through 110*d* in each of the first through third pixel regions PG1, PG2, PB, and PR may be reduced.

The first and second protrusions 120Pa and 120Pb of the pixel isolation structure 120 may be formed by using the same process applied to the pixel isolation structure 120. The first and second protrusions 120Pa and 120Pb of the pixel isolation structure 120 may be formed simultaneously with the first pixel isolators 120*a* and the second pixel isolators 120*b*. In an implementation, the pixel isolation structure 120 including the first and second protrusions 120Pa and 120Pb may be formed by sequentially burying the liner layer 120L and the conductive layer 120F in the pixel isolation trench 120T, which penetrates the element isolation pattern 115. In an implementation, a portion of the conductive layer 120F may be etched, and the capping layer 120C may also be formed on the conductive layer 120F.

Referring to FIGS. 5A through 5C, the plurality of sub pixel regions 110*a*, 110*b*, 100*c*, and 110*d* may be in each of the first through third pixel regions PG1, PG2, PB, and PR. The plurality of photoelectric conversion regions PD may be in the plurality of sub pixel regions 110*a* through 110*d*. In an implementation, as illustrated in the drawings, one photoelectric conversion region may be inside one sub pixel region.

In an implementation, the plurality of photoelectric conversion regions PD may be on each of the first through third pixel regions PG1, PG2, PB, and PR. The plurality of photoelectric conversion regions PD may include impurity regions doped with impurities of a second conductivity type (e.g., n type), which is opposite to the substrate 100 of a first conductivity type. The substrate 100 of the first conductivity type and a plurality of photoelectric conversion regions PD may constitute a pair of photodiodes. In an implementation, a photodiode may be formed by using a junction between the substrate 100 of the first conductivity type and the plurality of photoelectric conversion regions PD. The plurality of photoelectric conversion regions PD constituting the photodiode may generate and accumulate photocharges in proportion to the intensity of incident light.

In each of the first through third pixel regions PG1, PG2, PB, and PR, an electrical signal output from each of the plurality of photoelectric conversion regions PD may have a phase difference. In an implementation, the image sensor may measure a distance to an object by comparing the phase difference of the electrical signals output by the plurality of photoelectric conversion regions PD, and may automatically compensate for a focus of the image sensor by determining whether the focus on the object is correct, a degree of misalignment of the focus, or the like.

The first through fourth sub pixel regions 110*a*, 110*b*, 110*c*, and 110*d* may be spaced apart from each other in the first through third pixel regions PG1, PG2, PB, and PR in the first and second directions D1 and D2, e.g., the plurality of photoelectric conversion regions PD may be spaced apart from each other in each of the first through third pixel regions PG1, PG2, PB, and PR in the first and second directions D1 and D2.

Referring to FIGS. 6A through 6C, a second signal separation structure 135 may be between the plurality of photoelectric conversion regions PD in the second pixel region PB, and similarly, first and third signal separation structures 133 and 137 may be between the plurality of photoelectric conversion regions PD in the first pixel regions PG1 and PG2, and the third pixel regions PR.

In each of the first through third pixel regions PG1, PG2, PB, and PR, the first, second, and third signal separation structures 133, 135, and 137 may be between the plurality of sub pixel regions 110*a* through 110*d*. Light incident on the photoelectric conversion region PD in the first sub pixel region 110*a* may be blocked from being incident on the photoelectric conversion region PD in the second sub pixel region 110*b* by the first, second, and third signal separation structures 133, 135, and 137. Similarly, light incident on the first through fourth sub pixel regions 110*a* through 110*d* may be blocked from being incident on the other sub pixel regions 110*a*, 110*b*, 110*c*, and 110*d* by the first, second, third signal separation structures 133, 135, and 137. In an implementation, the signal separation structures 133, 135, and 137 may help prevent crosstalk between the plurality of sub pixel regions 110*a* through 110*d* in each of the first through third pixel regions PG1, PG2, PB, and PR. In an implementation, the signal separation structures 133, 135, and 137 may be at the center of each of the pixel regions PG1, PG2, PB, and PR. In an implementation, the center of the pixel regions PG1, PG2, PB, and PR may be referred to a point at the same distance from each of the first and second pixel isolators 120*a* and 120*b*.

In an implementation, the first signal separation structure 133 may be in each of the first pixel regions PG1 and PG2, the second signal separation structure 135 may be in the second pixel region PB, and the third signal separation structure 137 may be in the third pixel region PR.

Only the second pixel region PB is representatively illustrated in FIGS. 6A through 6C, and the description of the second pixel region PB may also be applied to the first pixel regions PG1 and PG2 and the third pixel region PR.

The second signal separation structure 135 may include an insulating material having a refractive index lower than that of, e.g., the substrate 100, and may include one or a plurality of insulating layers. In an implementation, the second signal separation structure 135 may include, e.g., a silicon oxide layer, a silicon nitride layer, an undoped polysilicon layer, air, or a combination thereof. The second signal separation structure 135 may be formed by patterning the first surface 100*a* or the second surface 100*b* of the substrate 100 to form a signal separation trench 135T, and then burying an insulating material in the signal separation trench 135T. This process may be applicable to the first signal separation structure 133 and the third signal separation structure 137.

The second signal separation structure 135 may be between the plurality of sub pixel regions 110*a* through 110*d*, in the second pixel region PB. In an implementation, the second signal separation structure 135 may be between the plurality of photoelectric conversion regions PD. The second signal separation structure 135 may be between the first pixel isolators 120a of the pixel isolation structure 120, and may be spaced apart from the first pixel isolators 120a of the pixel isolation structure 120. A length in the second direction D2 of the second signal separation structure 135 may be less than the isolation distance between the first pixel isolators 120a of the pixel isolation structure 120. The second signal separation structure 135 may have a second width that is less than a first width of the pixel isolation structure 120. This configuration may be applicable to the first signal separation structure 133 and the third signal separation structure 137.

Referring to FIGS. 6B and 6C, the second signal separation structure 135 may vertically extend from the second surface 100b of the substrate 100 toward the first surface 100a thereof, and a vertical depth of the second signal separation structure 135 may be less than the vertical depth of the pixel isolation structure 120. This configuration may be applicable to the first signal separation structure 133 and the third signal separation structure 137.

Referring to FIG. 6A, the second signal separation structure 135 may include, in a plan view, a first isolator 135a extending in the second direction D2 and a second isolator 135b extending in the first direction D1 and crossing the first isolator 135a. The second signal separation structure 135 may be spaced apart from the pixel isolation structure 120. In an implementation, the length of the second signal separation structure 135 in the first direction D1 and the second direction D2 may be less than the isolation distance between the first pixel isolators 120a of the pixel isolation structure 120. In an implementation, the length of the first isolator 135a in the second direction D2 may be substantially the same as the length in the first direction D1 of the second isolator 135b. Each of the first and second isolators 135a and 135b of the second signal separation structure 135 may have a second width W2, that is less than a first width W1 of the pixel isolation structure 120.

Referring to FIG. 6A, in the second pixel region PB, the first isolator 135a of the second signal separation structure 135 may be between the first sub pixel region 110a and the second sub pixel region 110b, and between the third sub pixel region 110c and the fourth sub pixel region 110d. The second isolator 135b may be between the first sub pixel region 110a and the third sub pixel region 110c and between the second sub pixel region 110b and the fourth sub pixel region 110d.

Referring to FIGS. 5A and 6A, the second signal separation structure 135 may include the first isolator 135a and the second isolator 135b crossing each other, and light incident on the second pixel region PB may be reflected in both the first direction D1 and the second direction D2 of the second signal separation structure 135. In an implementation, even when the incident light is randomly reflected by the second signal separation structure 135, the amount of light provided from the second pixel region PB to the first pixel region PG1 adjacent in the first direction D1 and the first pixel region PG2 adjacent in the second direction D2 may be substantially the same. Accordingly, an occurrence of noise difference according to positions of the first pixel regions PG1 and PG2 may be reduced. At the same time, a signal separation structure may be spaced apart from the pixel isolation structure 120, and light may be incident on the plurality of photoelectric conversion regions PD between the signal separation structure and the pixel isolation structure 120. Accordingly, an incident amount of light incident on the plurality of photoelectric conversion regions PD may be increased, and thus, a signal difference output by the plurality of photoelectric conversion regions PD in each of the first, second, third, and fourth sub pixel regions 110a, 110b, 110c, and 110d may be increased. Automatic focus operation characteristics for adjusting the position of the lens may be improved by comparing signals output by the plurality of photoelectric conversion regions PD.

In an implementation, the signal separation structures 133, 135, and 137 may, in each of the plurality of pixel regions PB, PG, and PR, help prevent a signal of one photoelectric conversion region PD from flowing to the other photoelectric conversion region PD among the plurality of photoelectric conversion regions PD inside the plurality of sub pixel regions 110a through 110d, thus may facilitate light separation. In an implementation, it may be possible to help prevent an automatic focus (AF) contrast from being deteriorated.

In an implementation, the second signal separation structure 135 may overlap the plurality of sub pixel regions 110a through 110d, and a portion of the plurality of photoelectric conversion regions PD in the plurality of sub pixel regions 110a through 110d.

The first through third signal separation structures 133, 135, and 137 may be formed after the pixel isolation structure 120 is formed. In an implementation, after the second surface 100b of the substrate 100 is patterned to form signal separation trenches 133T, 135T, and 137T, the first through third signal separation structures 133, 135, and 137 may be formed by burying an insulating material in the signal separation trenches 133T, 135T, and 137T.

As described above, the first signal separation structure 133 may be in each of the first pixel regions PG1 and PG2, the second signal separation structure 135 may be in the second pixel region PB, and the third signal separation structure 137 may be in the third pixel region PR.

In addition, as described above, the pixel isolation structure 120 may further include first protrusions 120Pa and second protrusions 120Pb, which locally and respectively protrude from the first pixel isolators 120a and the second pixel isolators 120b toward the center of each of the first through third pixel regions PG1, PG2, PB, and PR.

Referring to FIG. 6A, the first isolator 135a of the second signal separation structure 135 may be between the first protrusions 120Pa of the pixel isolation structure 120, and the second isolator 135b of the pixel isolation structure 120 may be between the second protrusions 120Pb. Similarly, first isolators 133a and 137a of the first and third signal separation structures 133 and 137 may be between the first protrusions 120Pa of the pixel isolation structure 120, and second isolators 133b and 137b of the first and third signal separation structures 133 and 137 may be between the second protrusions 120Pb of the pixel isolation structure 120.

As described above, the plurality of photoelectric conversion regions PD may be spaced apart from each other in the first direction D1 and the second direction D2 in each of the first through third pixel regions PG1, PG2, PB, and PR, and the first and second protrusions 120Pa and 120Pb of the pixel isolation structure 120 may be between the plurality of photoelectric conversion regions PD.

In an implementation, in each of the first and second pixel regions PG1, PG2, and PB, a dummy isolation impurity region may also be between the plurality of sub pixel regions 110a through 110d, and under the first and second signal separation structures 133 and 135. The dummy isolation impurity region (may be formed by ion-implanting impurities of the same conductivity type (e.g., p-type) as impurities of the substrate 100 into the substrate 100. The dummy isolation impurity region may separately provide incident light on the plurality of photoelectric conversion regions PD in the first, second, third, and fourth sub pixel regions 110a, 110b, 110c, and 110d by a potential barrier.

Furthermore, according to embodiments, in each of the first through third pixel regions PG1, PG2, PB, and PR, a floating diffusion region FD may be between the plurality of photoelectric conversion regions PD. In an implementation, as illustrated in FIG. 6C, the floating diffusion region FD may be between two sub pixel regions 110c and 110d. In an implementation, in each of the first through third pixel regions PG1, PG2, PB, and PR, the floating diffusion region FD may be formed by ion injecting impurities of a second conductivity type to the first surface 100a of the substrate 100.

In an implementation, on the first surface 100a of the substrate 100, transfer gate electrodes TG may be respectively between the third sub pixel region 110c and the floating diffusion region FD and between the fourth sub pixel region 110d and the floating diffusion region FD.

A portion of a plurality of transfer gate electrodes TG may be in the substrate 100, and gate insulating layers may be between the plurality of transfer gate electrodes TG and the substrate 100.

The floating diffusion region FD may be in the substrate 100 between the plurality of transfer gate electrodes TG. The floating diffusion region FD may be formed by ion injecting impurities opposite to impurities of the substrate 100. In an implementation, the floating diffusion region FD may be an n-type impurity region.

Interlayer insulating layers 220 may be stacked on the first surface 100a of the substrate 100, and the interlayer insulating layers 220 may cover metal-oxide-semiconductor (MOS) transistors and transfer gate electrodes TG, which constitute readout circuits. The interlayer insulating layers may include, e.g., silicon oxide, silicon nitride, or silicon oxynitride. A conductive line 210 may be on each of the interlayer insulating layers 220, and the conductive lines 210 may be electrically connected to the readout circuits via the contact plugs.

Color filters 320G, 320B, and 320R and micro lenses 330 may be on the second surface 100b of the substrate 100. In an implementation, a planarized insulating layer 301 may be between the second surface 100b of the substrate 100 and the color filters 320G, 320B, and 320R. The color filters 320G, 320B, and 320R and the micro lenses 330 may be arranged in correspondence to each of the first pixel regions PG1 and PG2, and the second and third pixel structures PB and PR. In an implementation, one color filter and one micro lens may correspond to one pixel region, one pixel region may include a plurality of sub pixel regions, and the one color filter and the one micro lens may correspond to the plurality of sub pixel regions.

The color filters 320G, 320B, and 320R may include color filters of red color, green color, and red color, respectively. In an implementation, the color filters may also include other colors, such as cyan, magenta, and yellow. In an implementation, the green color filters 320G may be in the first pixel regions PG1 and PG2, the blue color filters 320B may be in the second pixel region PB, and the red color filters 320R may be in the third pixel region PR.

The micro lens 330 may have a convex shape to help condense incident light on the first through third pixel regions PG1, PG2, PB, and PR. In an implementation, each of the micro lenses 330 may, in a plan view, overlap the first through fourth sub pixel regions 110a through 110d, and each of the photoelectric conversion regions PD in the first through fourth sub pixel regions 110a through 110d.

A grid pattern 310 may be between the color filters 320G, 320B, and 320R. Similar to the pixel isolation structure 120, the grid pattern 310 may have a lattice shape in a plan view. The grid pattern 310 may include a metal material, e.g., tungsten or aluminum.

In the embodiments to be described below, the same reference numerals are used for components substantially the same as those of the above-described embodiments, and differences from the previous embodiments will be described in detail.

Hereinafter, various embodiments are illustrated in FIGS. 7A and 7B, FIGS. 8A through 8G, and 9A through 9I, and the second pixel region PB is illustrated representatively, but the descriptions may be applied to the first pixel regions PG1 and PG2 and the third pixel region PR.

Figure 7A:
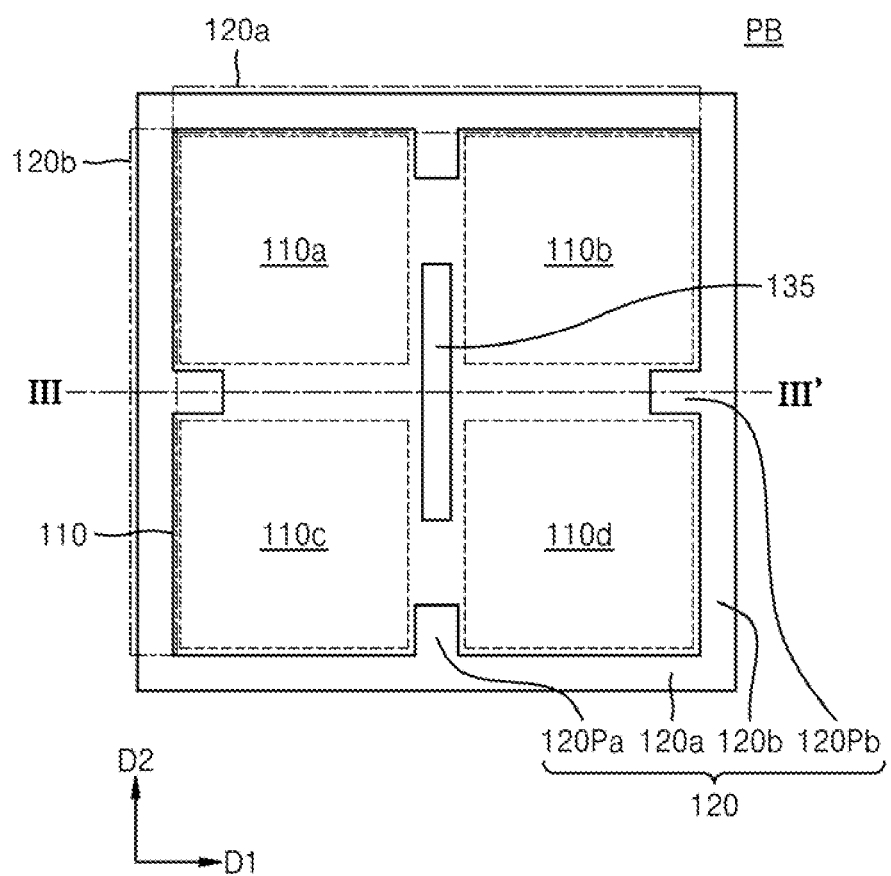
Figure 7B:
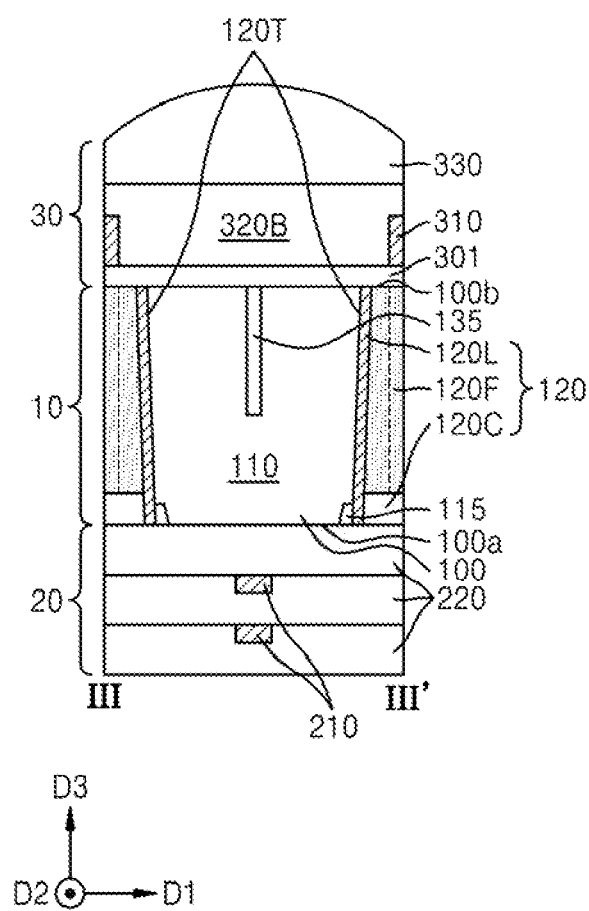
FIG. 7B is a cross-sectional view of an active pixel sensor array of an image sensor, according to an embodiment, taken along line in FIG. 7A.

FIG. 7A is a plan view of a portion of an active pixel sensor array of an image sensor, according to an embodiment. FIG. 7B is a cross-sectional view of an active pixel sensor array of an image sensor, according to an embodiment, taken along line in FIG. 7A.

Referring to FIGS. 7A and 7B, the second signal separation structure 135 may have a bar shape extending (e.g., lengthwise) in the second direction D2 between the first protrusions 120Pa of the pixel isolation structure 120 in a plan view. In this case, the pixel isolation structure 120 may have the first width W1, and the second signal separation structure 135 may have the second width W2, that is less than the first width W1. The second signal separation structure 135 may be between the first and third sub pixel regions 110a and 110c, and the second and fourth sub pixel regions 110b and 110d. In an implementation, the second signal separation structure 135 may overlap the plurality of sub pixel regions 110a through 110d, and a portion of the plurality of photoelectric conversion regions PD arranged in the plurality of sub pixel regions 110a through 110d.

In an implementation, the second signal separation structure 135 may have a bar shape extending in the first direction D1 between the second protrusions 120Pb of the pixel isolation structure 120. The second signal separation structure 135 may be between the first and second sub pixel regions 110a and 110b, and the third and fourth sub pixel regions 110c and 110d.

FIGS. 8A, 8B, 8C, 8D, 8E, 8F, and 8G are plan views of portions of an active pixel sensor array of an image sensor, according to embodiments.

Figure 8A:
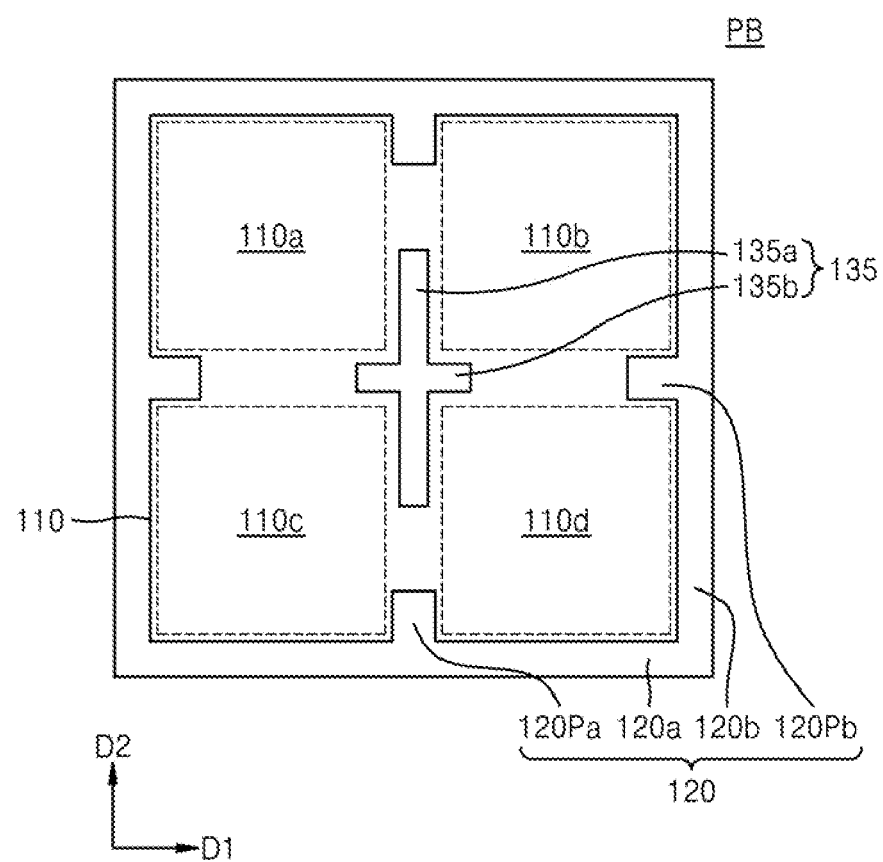

Referring to FIG. 8A, in the second pixel region PB, the second signal separation structure 135 may include the first isolator 135a extending in the second direction D2 and the second isolator 135b crossing the first isolator 135a and protruding in the first direction D1. In this case, the first and second isolators 135a and 135b may be spaced apart from the pixel isolation structure 120. A long axis length of the second isolator 135b may be less than a long axis length of the first isolator 135a. In an implementation, the long axis length of the first isolator 135a may be less than the long axis length of the second isolator 135b. The second signal separation structure 135 may be between the first and third sub pixel regions 110a and 110c, and the second and fourth sub pixel regions 110b and 110d. In an implementation, the first and second isolators 135a and 135b may overlap the plurality of sub pixel regions 110a through 110d, and a portion of the plurality of photoelectric conversion regions PD (refer to FIG. 8C) in the plurality of sub pixel regions 110a through 110d.

Figure 8B:
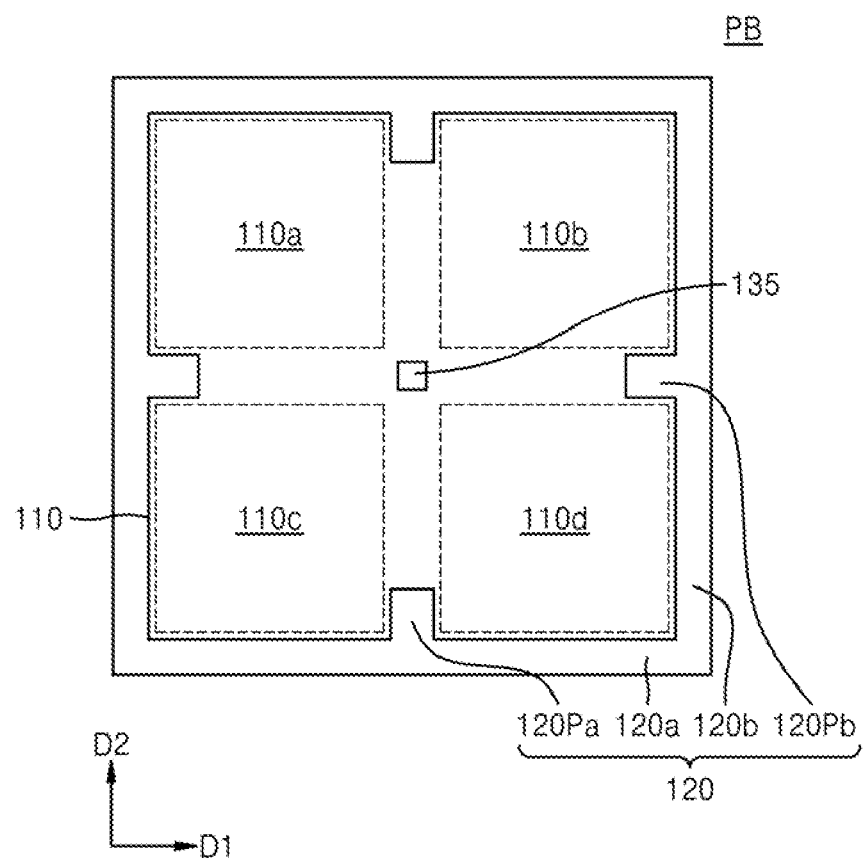

In an implementation, referring to FIG. 8B, the second signal separation structure 135 may have a rectangular (e.g., square) or circular shape in a plan view. In this case, the second signal separation structure 135 may be spaced apart from the pixel isolation structure 120. The second signal separation structure 135 may be between the plurality of sub pixel regions 110a through 110d. In an implementation, the second signal separation structure 135 may overlap the plurality of sub pixel regions 110a through 110d, and a portion of the plurality of photoelectric conversion regions PD (refer to FIG. 8C) arranged in the plurality of sub pixel regions 110a through 110d.

FIGS. 8C through 8G illustrate the second pixel region PB, in which the plurality of sub pixel regions include the first sub pixel region 110a and the second sub pixel region 110b.

Figure 8C:
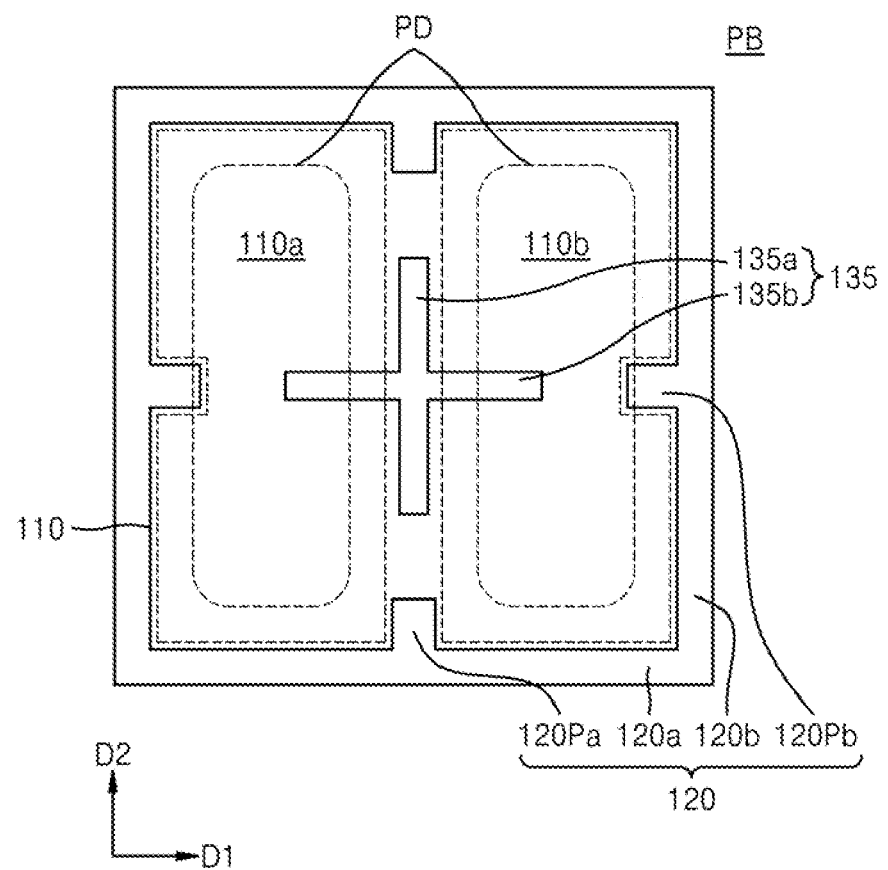

Referring to FIG. 8C, like in FIG. 6A, the second signal separation structure 135 may include, in a plan view, a first isolator 135a extending in the second direction D2 and a second isolator 135b extending in the first direction D1 and crossing the first isolator 135a. The second signal separation structure 135 may be spaced apart from the pixel isolation structure 120. In an implementation, the length of the second signal separation structure 135 in the first direction D1 and the second direction D2 may be less than the isolation distance between the first pixel isolators 120a of the pixel isolation structure 120. In an implementation, the length of the first isolator 135a in the second direction D2 may be substantially the same as the length in the first direction D1 of the second isolator 135b. Each of the first and second isolators 135a and 135b of the second signal separation structure 135 may have a second width less than a first width of the pixel isolation structure 120.

Referring to FIG. 8C, in the second pixel region PB, the first isolator 135a of the second signal separation structure 135 may be between the first sub pixel region 110a and the second sub pixel region 110b. In an implementation, the first isolator 135a may overlap the first and second sub pixel regions 110a and 110b and a portion of the plurality of photoelectric conversion regions PD (refer to FIG. 8C) in the first and second sub pixel regions 110a and 110b. The second isolator 135b may cross the first and second sub pixel regions 110a and 110b in the first direction D1, and may overlap the first and second sub pixel regions 110a and 110b and a portion of the plurality of photoelectric conversion regions PD (refer to FIG. 8C) in the first and second sub pixel regions 110a and 110b.

Figure 8D:
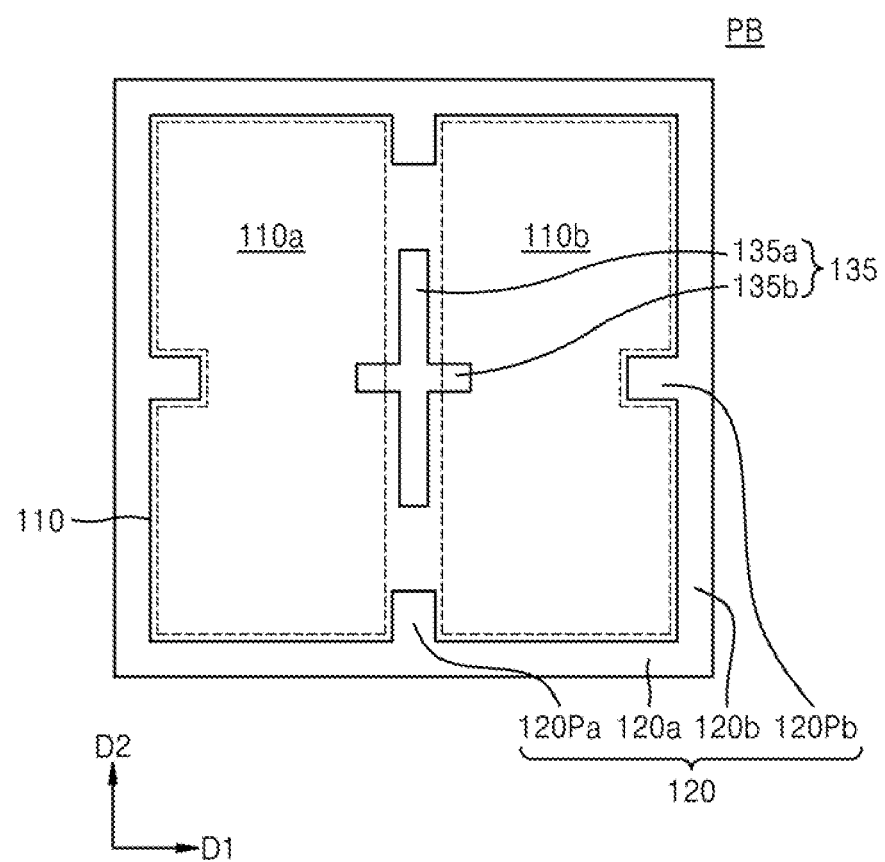

Referring to FIG. 8D, as illustrated in FIG. 8A, the long axis length of the second isolator 135b of the second signal separation structure 135 may be less than the long axis length of the first isolator 135a. In an implementation, the long axis length of the first isolator 135a may be less than the long axis length of the second isolator 135b. The second signal separation structure 135 may be spaced apart from the pixel isolation structure 120. In an implementation, the length of the second signal separation structure 135 in the first direction D1 and the second direction D2 may be less than the isolation distance between the first pixel isolators 120a of the pixel isolation structure 120. Each of the first and second isolators 135a and 135b of the second signal separation structure 135 may have a second width less than a first width of the pixel isolation structure 120. The first isolator 135a of the second signal separation structure 135 may be between the first sub pixel region 110a and the second sub pixel region 110b. In an implementation, the first isolator 135a may overlap the first and second sub pixel regions 110a and 110b and a portion of the plurality of photoelectric conversion regions PD (refer to FIG. 8C) in the first and second sub pixel regions 110a and 110b. The second isolator 135b may cross the first and second sub pixel regions 110a and 110b in the first direction D1, and may overlap the first and second sub pixel regions 110a and 110b and a portion of the plurality of photoelectric conversion regions PD (refer to FIG. 8C) in the first and second sub pixel regions 110a and 110b.

Figure 8E:
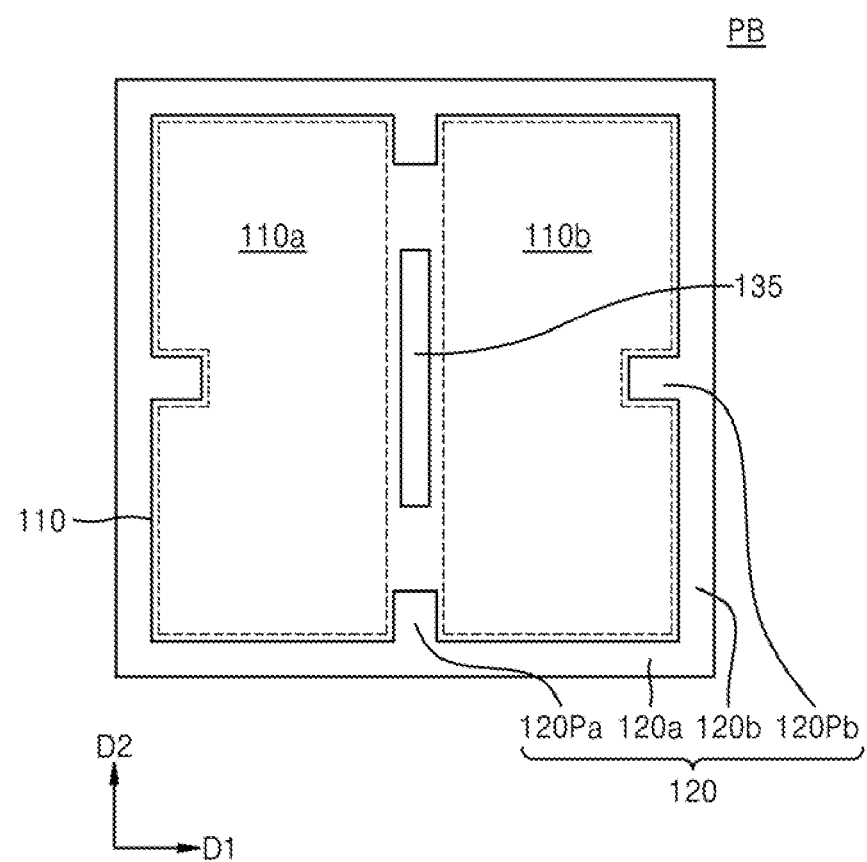

Referring to FIG. 8E, similar to as illustrated in FIG. 7A, the second signal separation structure 135 may have a bar shape extending in the second direction D2 between the first protrusions 120Pa of the pixel isolation structure 120 in a plan view. In this case, the pixel isolation structure 120 may have the first width W1, and the second signal separation structure 135 may have the second width W2, that is less than the first width W1. The second signal separation structure 135 may be between the first sub pixel region 110a and the second sub pixel region 110b. In an implementation, the second signal separation structure 135 may overlap the first and second sub pixel regions 110a and 110b and a portion of the plurality of photoelectric conversion regions PD (refer to FIG. 8C) in the first and second sub pixel regions 110a and 110b.

Figure 8F:
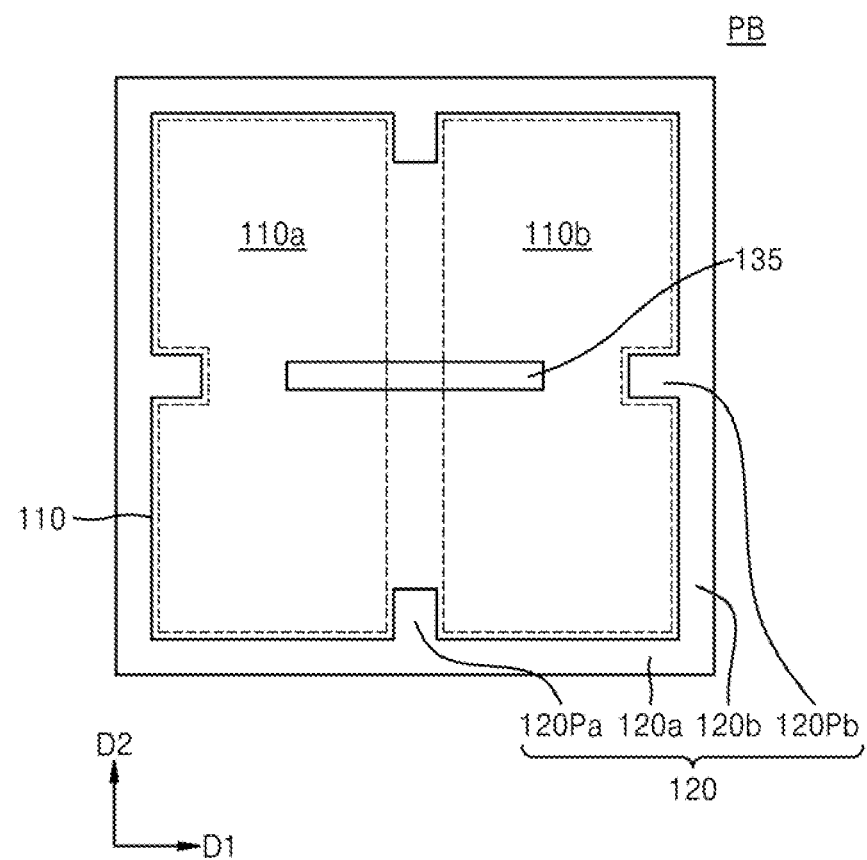

Referring to FIG. 8F, the second signal separation structure 135 may have a bar shape extending in the first direction D1 between the second protrusions 120Pb of the pixel isolation structure 120 in a plan view. In an implementation, the second signal separation structure 135 may overlap the first and second sub pixel regions 110a and 110b and a portion of the plurality of photoelectric conversion regions PD (refer to FIG. 8C) in the first and second sub pixel regions 110a and 110b.

Figure 8G:
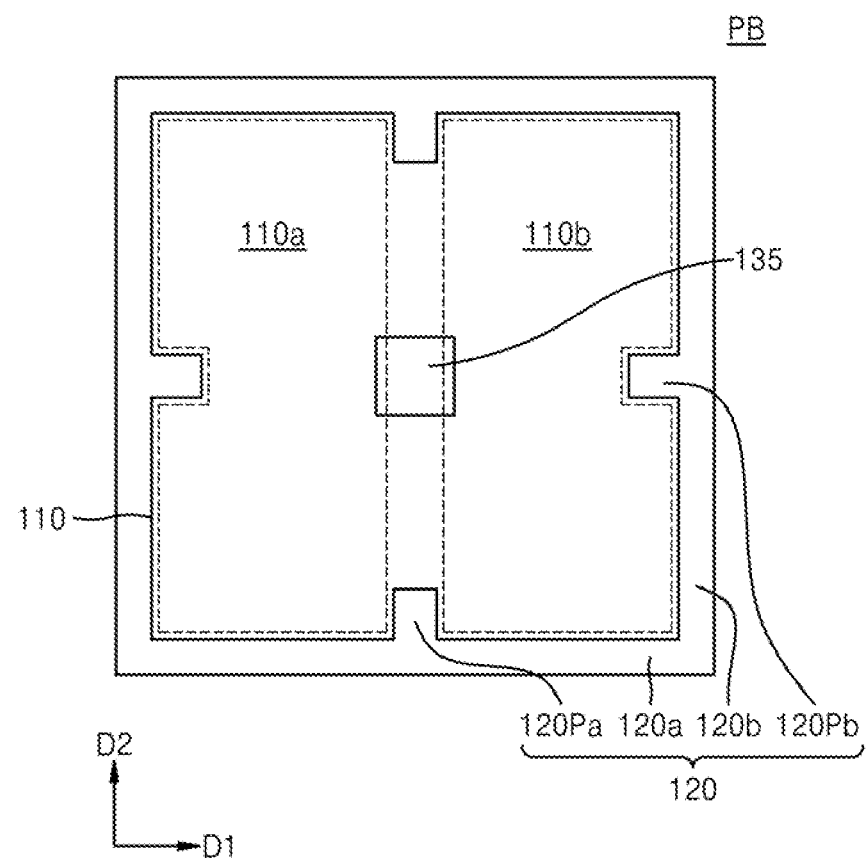

In an implementation, referring to FIG. 8G, the second signal separation structure 135 may have a rectangular or circular shape in a plan view. In this case, the second signal separation structure 135 may be spaced apart from the pixel isolation structure 120. The second signal separation structure 135 may be between the first and second sub pixel regions 110a and 110b. In an implementation, the second signal separation structure 135 may overlap the plurality of sub pixel regions 110a and 110b, and a portion of the plurality of photoelectric conversion regions PD (refer to FIG. 8C) arranged in the plurality of sub pixel regions 110a and 110b.

Referring to FIGS. 8C through 8G, in the second pixel region PB, the second signal separation structure 135 may be spaced apart from the pixel isolation structure 120 in both first direction D1 and the second direction D2. Accordingly, light may be provided to a plurality of photoelectric conversion regions PD without diffused reflection at an edge portion of the second pixel region PB.

In an implementation, referring to FIGS. 9A through 9I, in FIGS. 7A, 7B, and 8A through 8G, the first protrusions 120Pa or the second protrusions 120Pb of the pixel isolation structure 120 may be omitted.

Figure 9A:
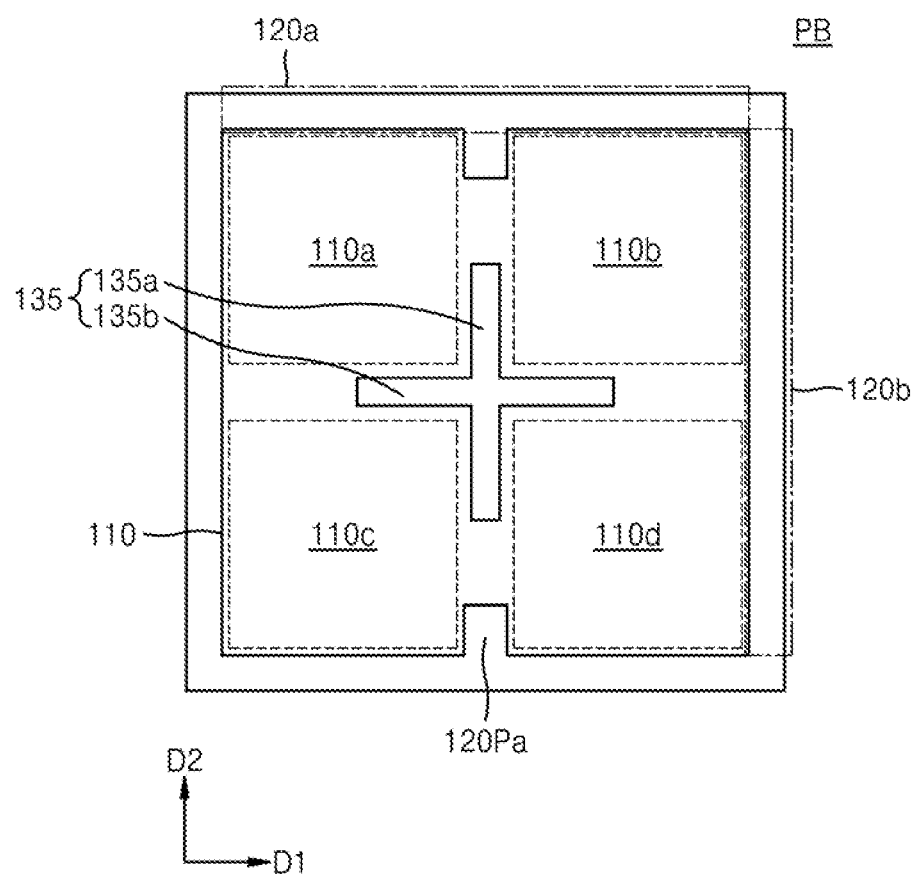
FIGS. 9A, 9B, 9C, 9D, 9E, 9F, 9G, 9H, and 9I are plan views of an active pixel sensor array of an image sensor, according to embodiments.
Figure 9B:
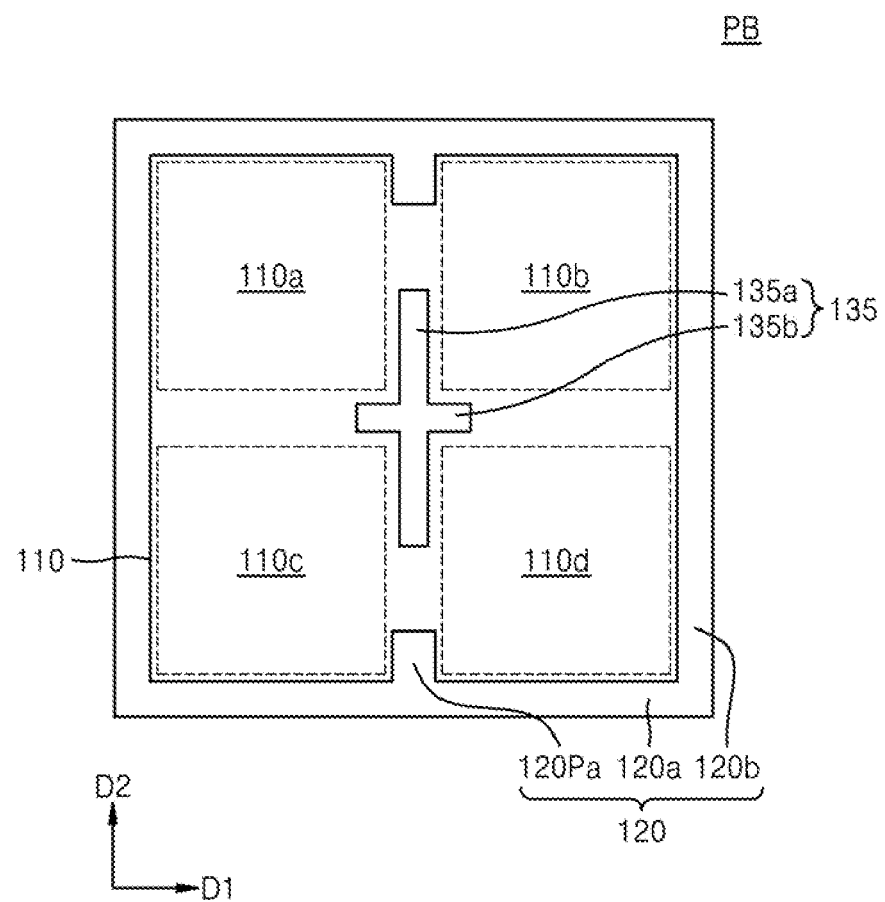
Figure 9C:
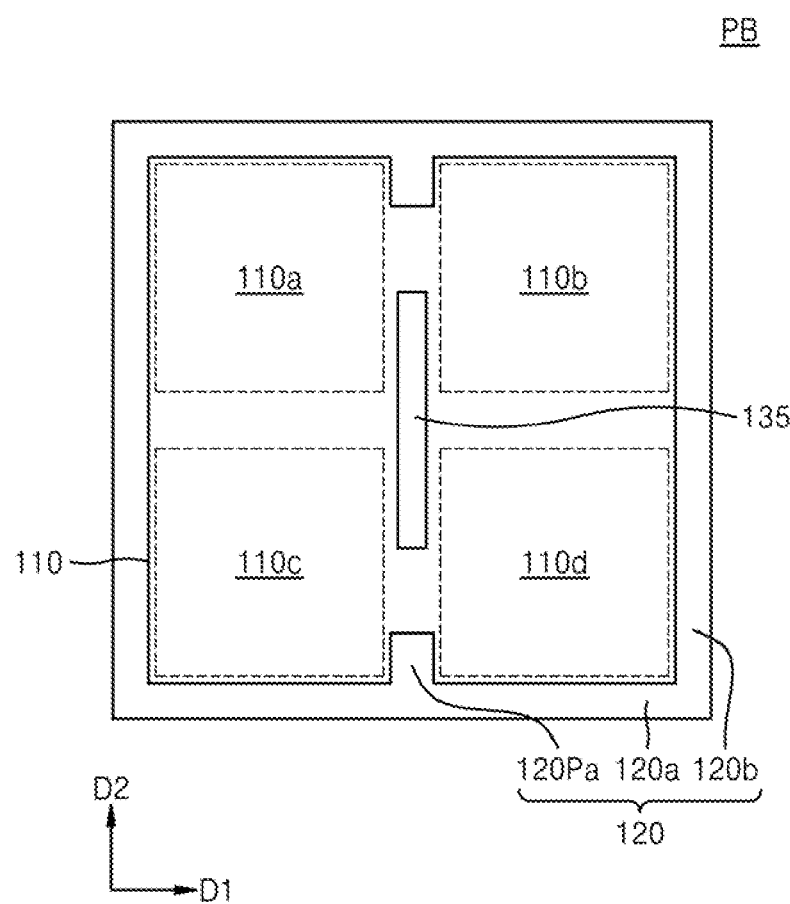
Figure 9D:
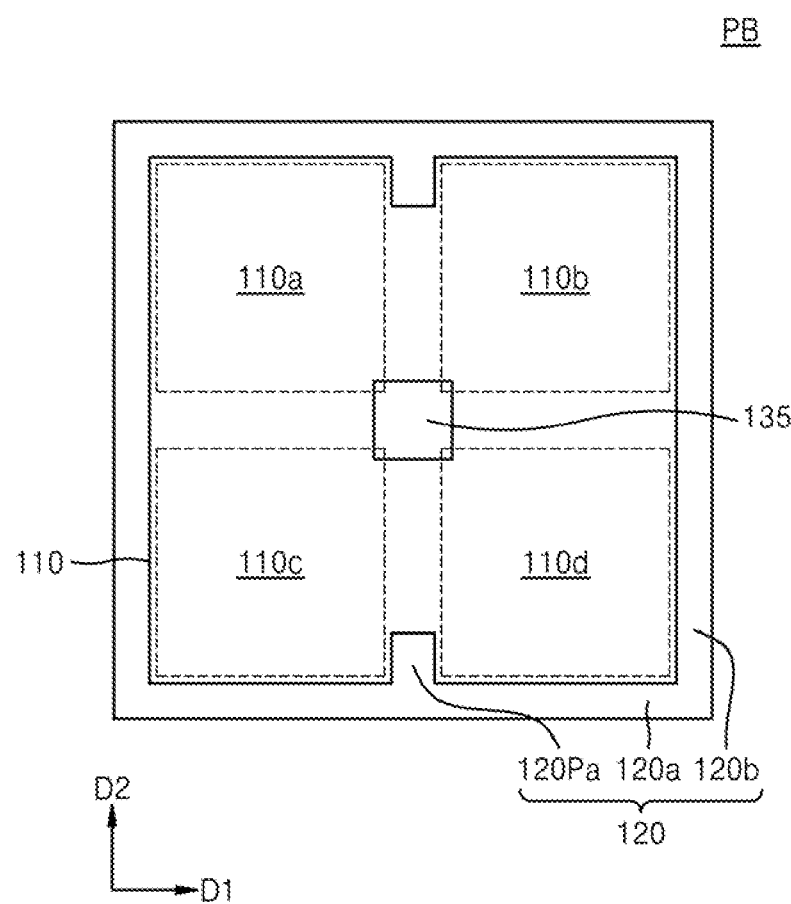
Figure 9E:
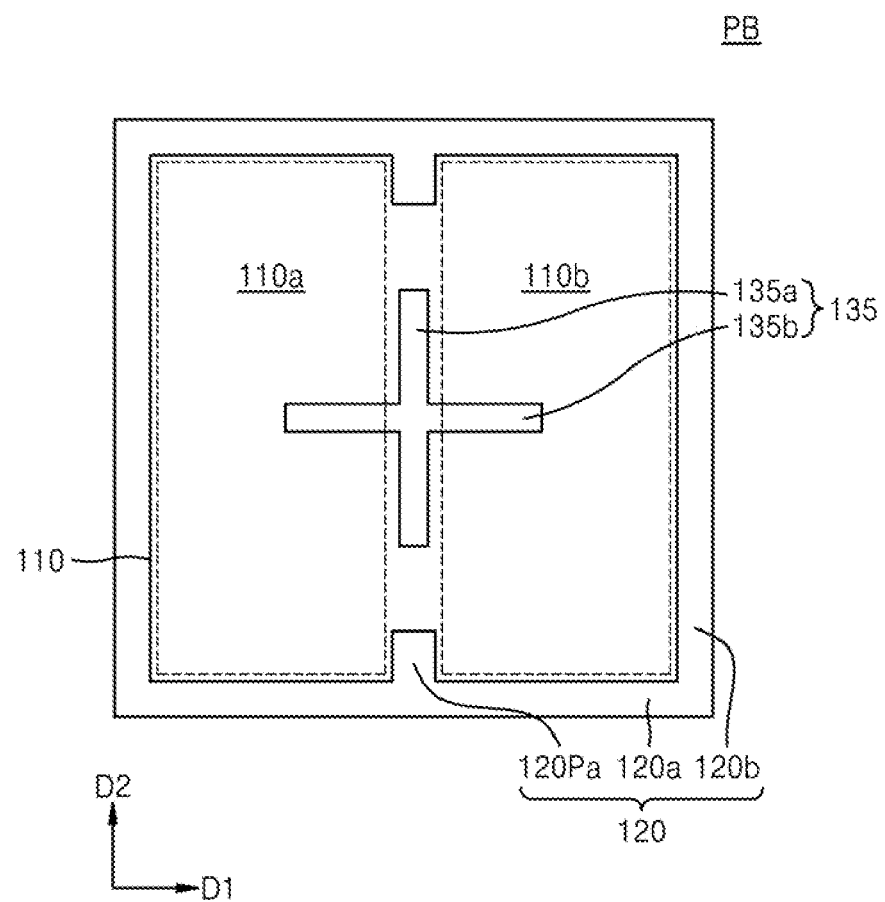
Figure 9F:
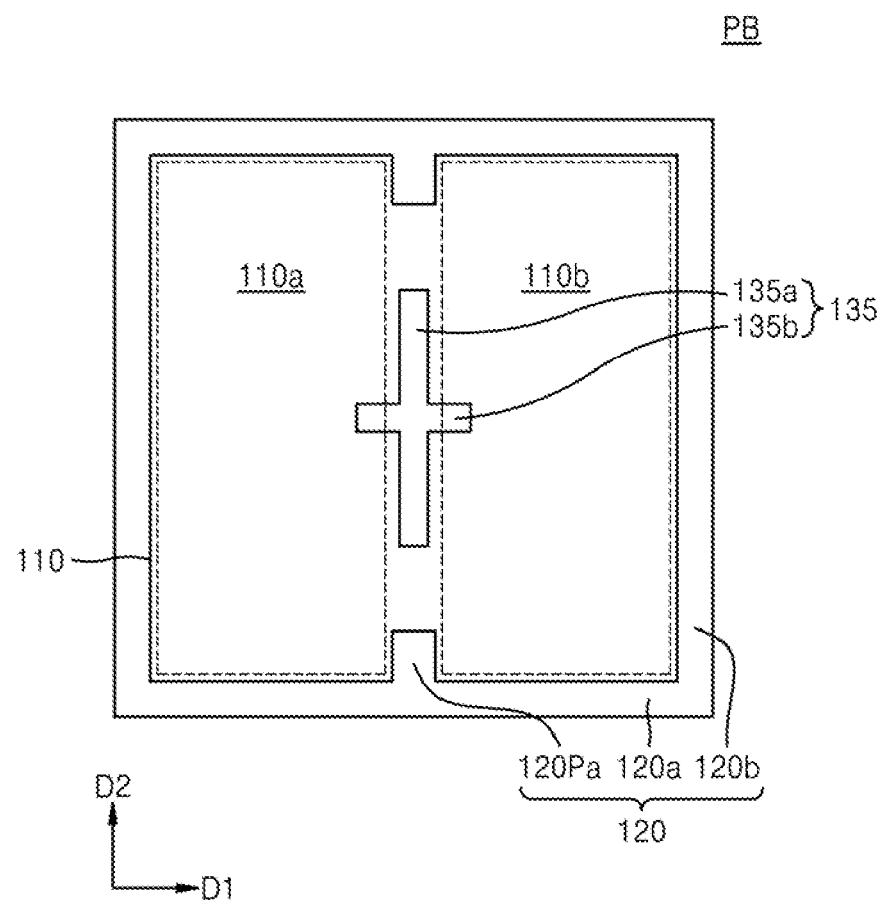
Figure 9G:
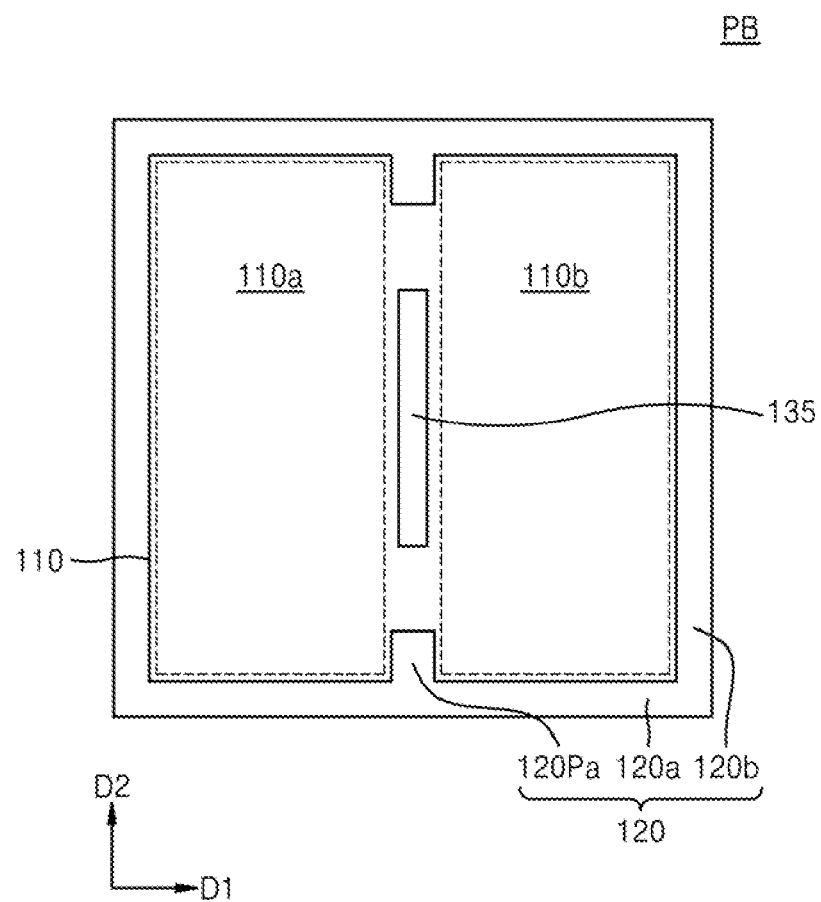
Figure 9H:
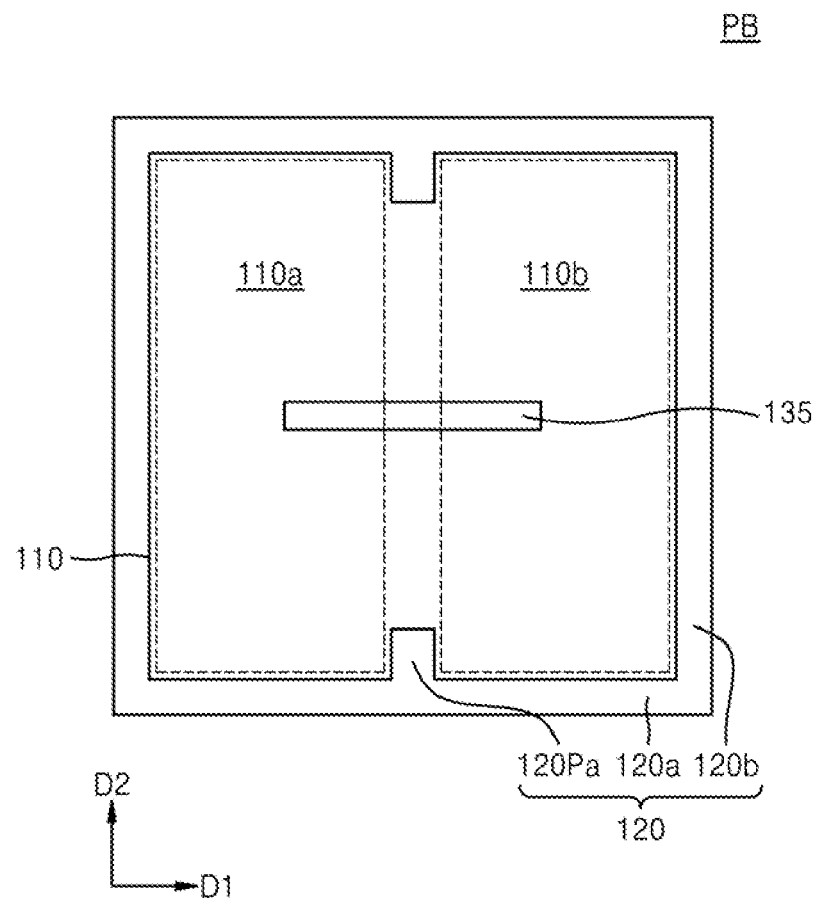
Figure 9I:
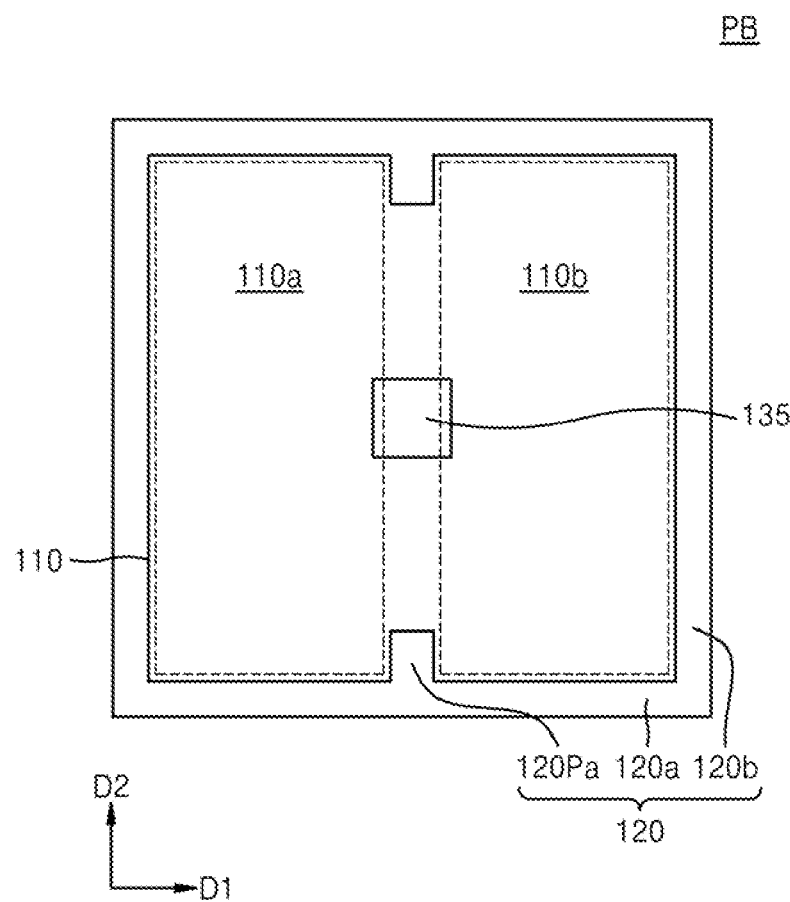

FIGS. 9A and 9I are plan views of an active pixel sensor array of an image sensor, according to embodiments. Contents of FIGS. 7A, 7B, and 8A through 8G may also be applied to FIGS. 9A through 9I, except that any one of the first protrusions 120Pa and the second protrusions 120Pb may be omitted.

FIGS. 10A, 10B, 10C, 10D, and 10E are plan views of an active pixel sensor array of an image sensor, according to embodiments.

Referring to FIGS. 10A through 10E, the first through third signal separation structures 133, 135, and 137 in the first through third pixel regions PG, PB, and PR may have different shapes from each other.

Figure 10A:
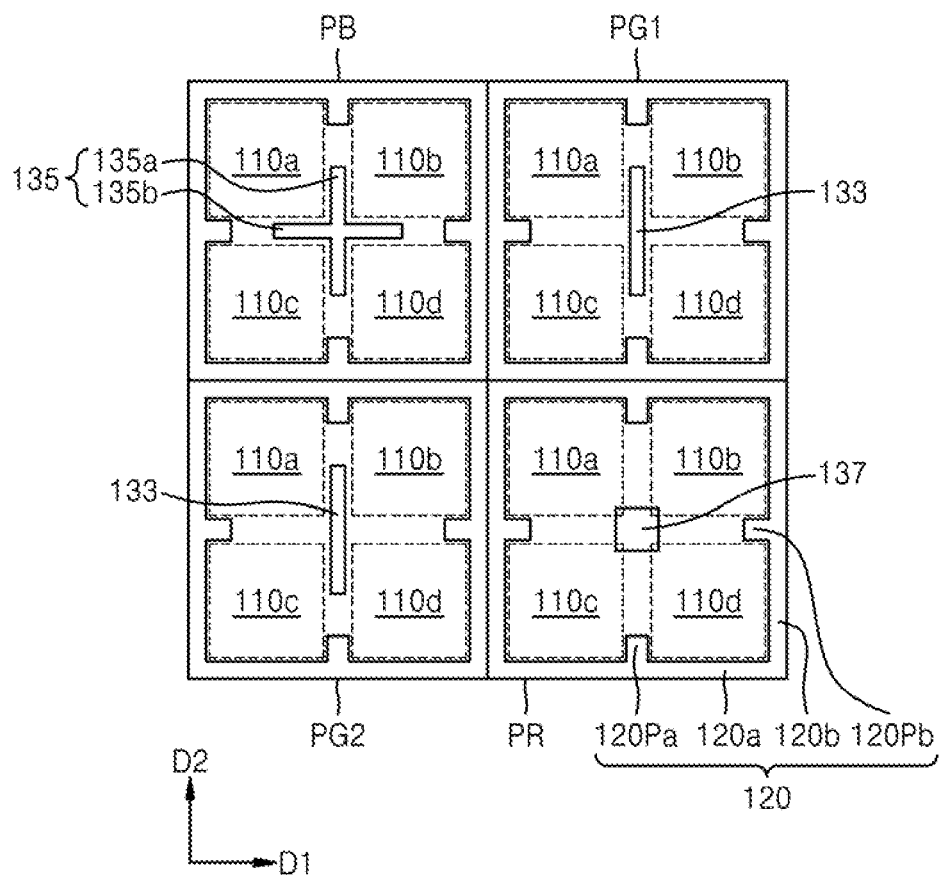
FIGS. 10A, 10B, 10C, 10D, and 10E are plan views of an active pixel sensor array of an image sensor, according to embodiments.
Figure 10B:
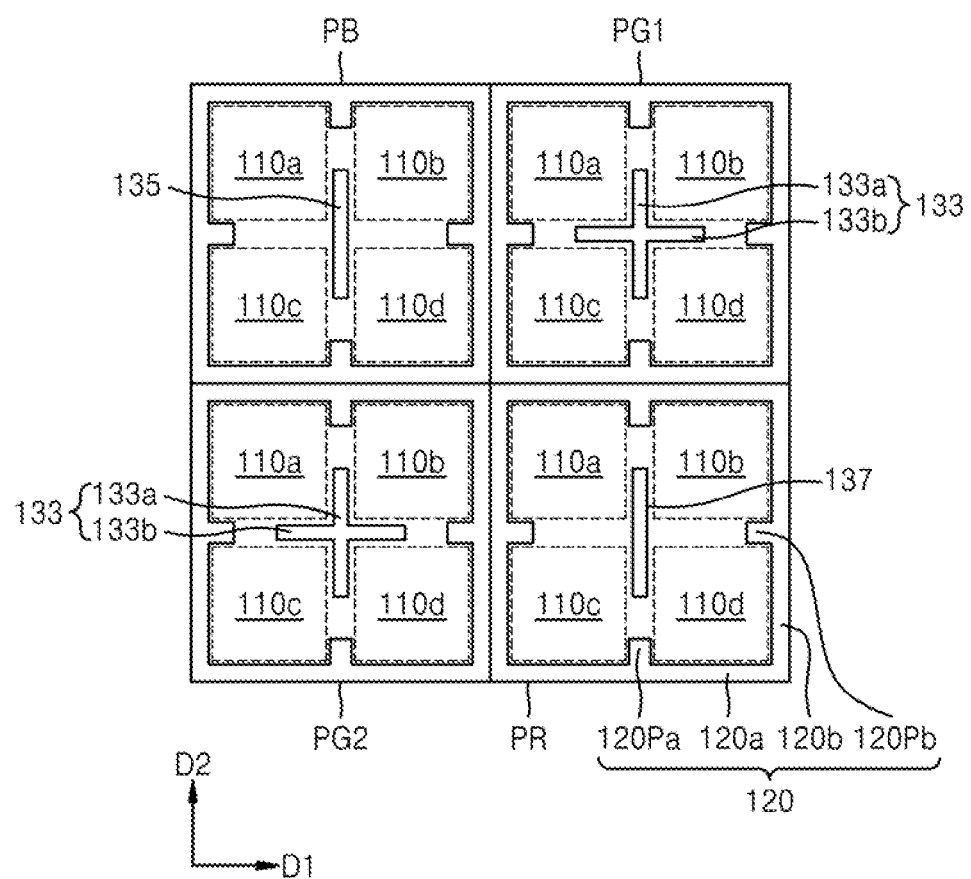
Figure 10C:
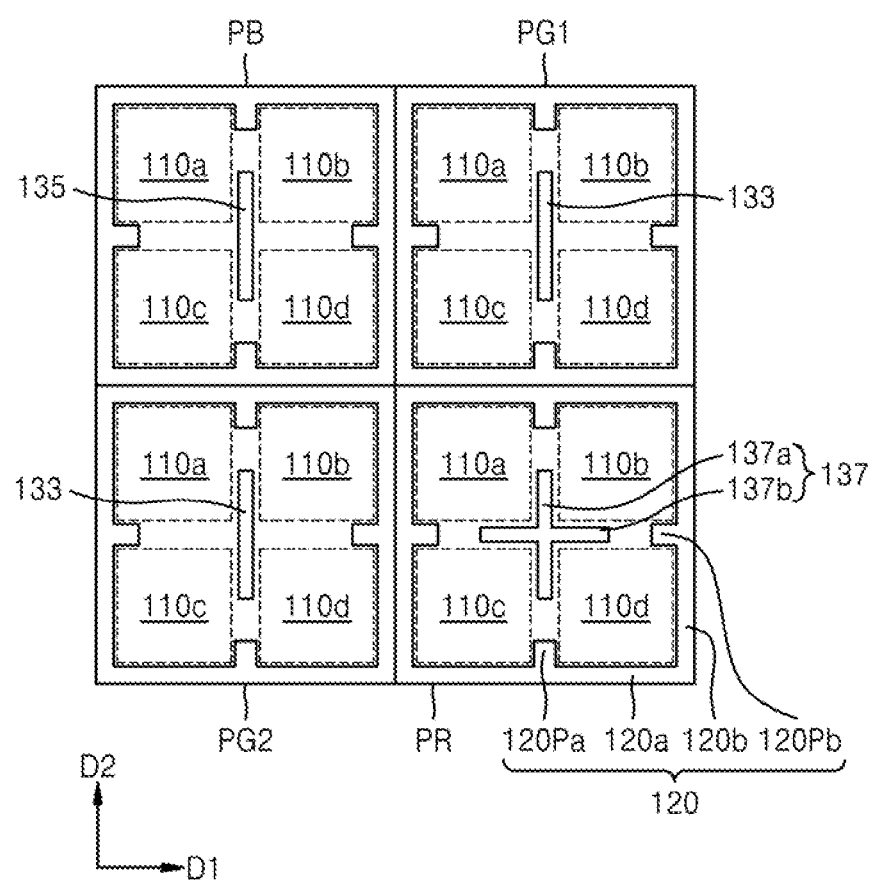
Figure 10D:
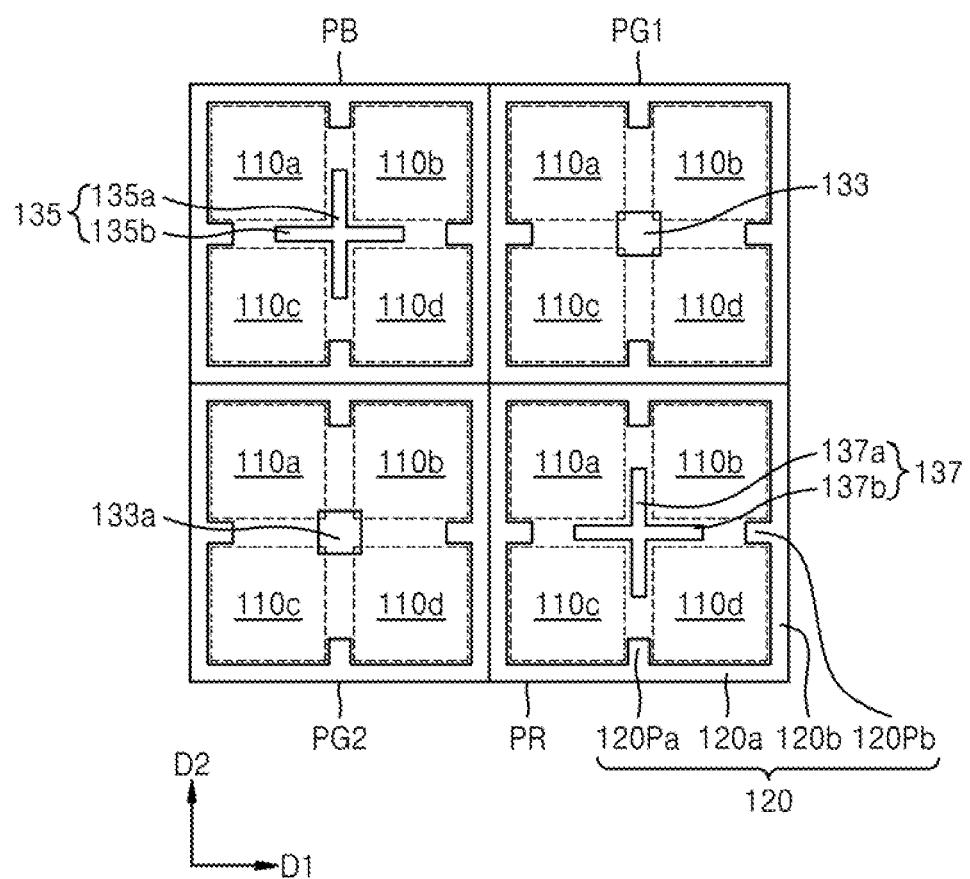
Figure 10E:
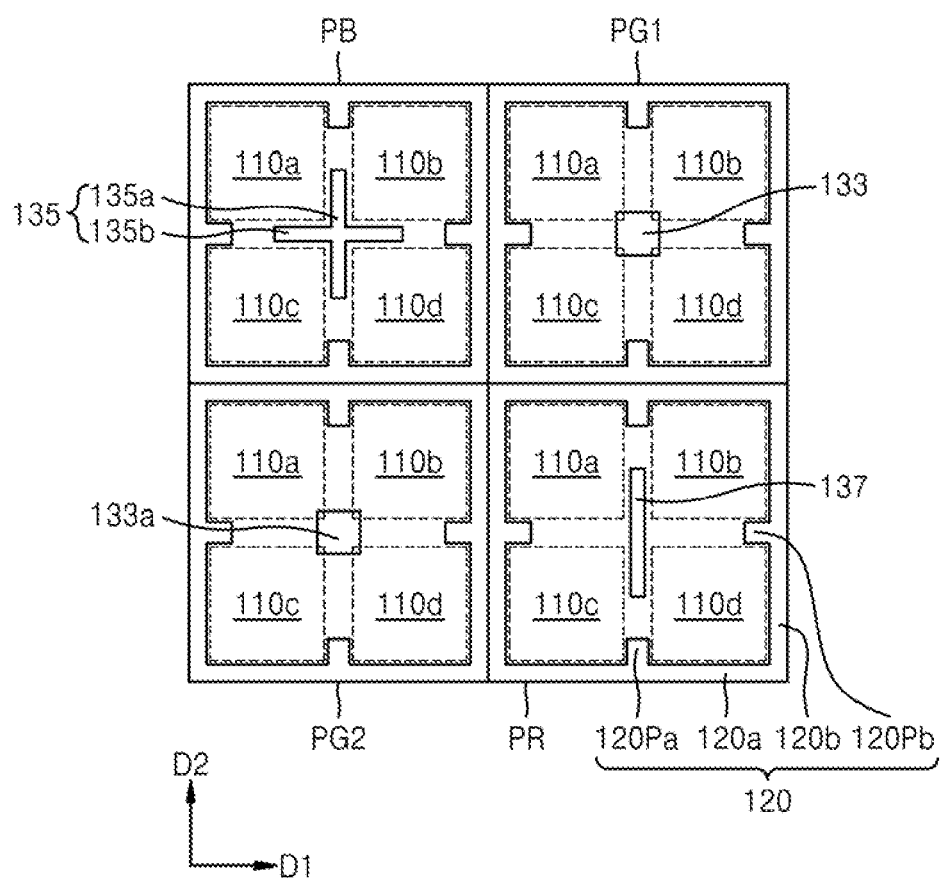

Referring to FIG. 10A, the first through third signal separation structures 133, 135, and 137 may have all different shapes from each other. In an implementation, the first signal separation structure 133 may have a cross-shaped cross-section including portions extending in the first direction D1 and the second direction D2, the second signal separation structure 135 may have a bar-shaped cross-section extending in the second direction D2, and the third signal separation structure 137 may have a rectangular or circular cross-section. Referring to FIG. 10B, the second and third signal separation structures 135 and 137 may have the same shape, and the first signal separation structure 133 may have a different shape from the second and third signal separation structures 135 and 137. In an implementation, the first signal separation structure 133 may have a cross-shaped cross-section including portions extending in the first direction D1 and the second direction D2, and the second and third signal separation structures 137 may have a bar-shaped cross-section extending in the second direction D2. Referring to FIG. 10C, the first and second signal separation structures 133 and 135 may have the same shape, and the third signal separation structure 137 may have a different shape from the first and second signal separation structures 133 and 135. In an implementation, the first and second signal separation structures 133 and 135 may have a bar-shaped cross-section extending in the second direction D2, and the third signal separation structure 137 may have a cross-shaped cross-section including portions extending in the first direction D1 and the second direction D2.

Figure 11A:
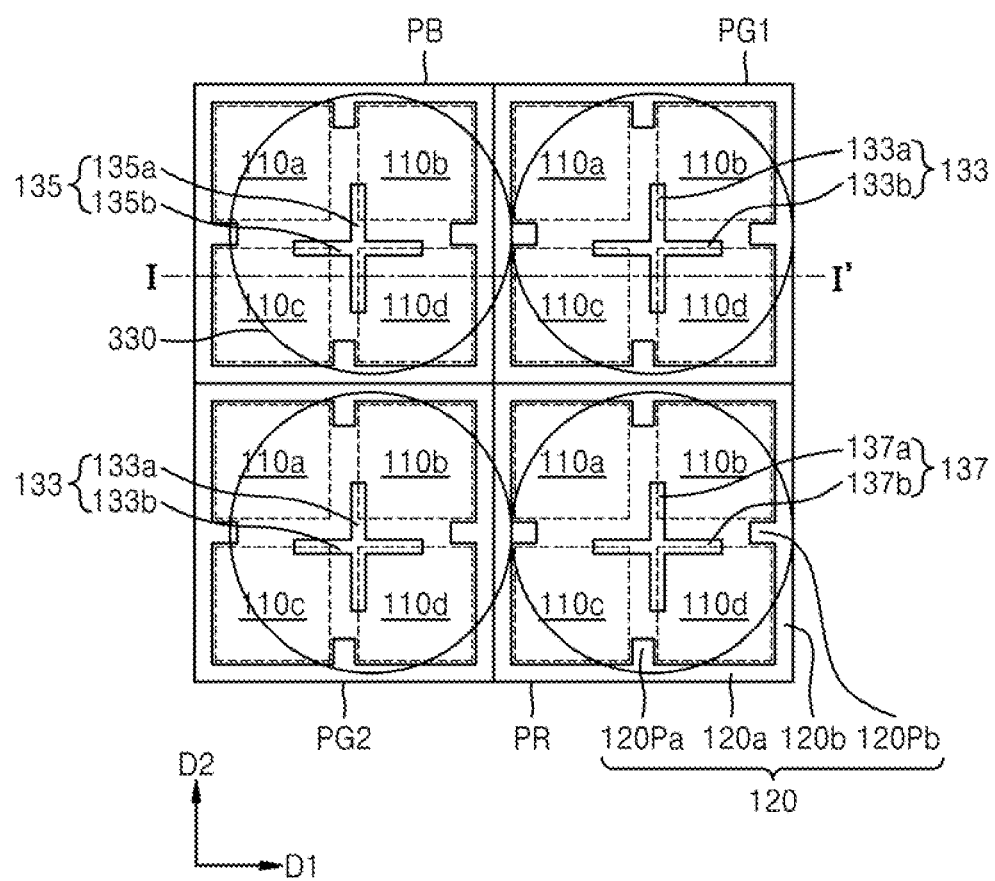
FIG. 11A is a plan view of an active pixel sensor array of an image sensor, according to an embodiment.
Figure 11B:
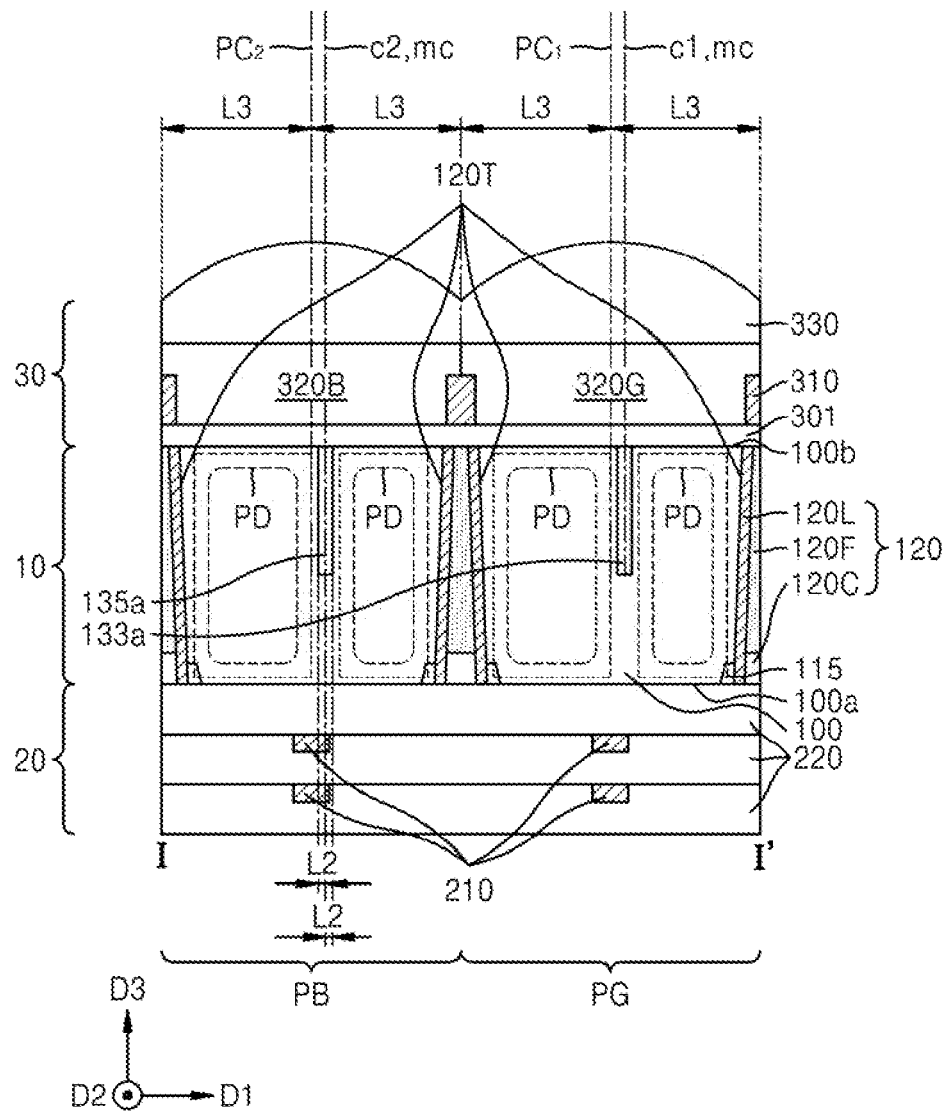
FIG. 11B is a cross-section of an active pixel sensor array of an image sensor, according to an embodiment, taken along line I-I' in FIG. 11A.

FIG. 11A is a plan view of an active pixel sensor array of an image sensor, according to an embodiment. FIG. 11B is a cross-section of an active pixel sensor array of an image sensor, according to an embodiment, and is a cross-section taken along line I-I' in FIG. 11A.

Referring to FIGS. 11A and 11B, in an active pixel sensor array, according to positions of the first through third pixel regions PG1, PG2, PB, and PR, planar positions of the first through third separation structures 133, 135, and 137 may vary in each of the first through third pixel regions PG1, PG2, PB, and PR. As described above with reference to FIG. 2, the pixel array region (refer to R1 in FIG. 2) may include the central region (CR in FIG. 2) and edge regions (ER in FIG. 2). In the first through third pixel regions PG1, PG2, PB, and PR arranged in the edge regions (ER in FIG. 2), the first through third separation structures 133, 135, and 137 may be shifted toward the central region (CR in FIG. 2), as illustrated in FIG. 11A.

Referring to FIGS. 11A and 11B, in a plan view, a center c1 of the first signal separation structure 133 may be offset (e.g., non-concentric or non-aligned) from a center $PC_1$ of the first pixel regions PG1 and PG2, and a center c2 of the second signal separation structure 135 may be offset from a center $PC_2$ of the second pixel region PB. In this case, the center c1 of the first signal separation structure 133 may be an intersection point of the first and second isolators 133a and 133b, and the center C1 of the second signal separation structure 135 may be an intersection point of the first and second isolators 135a and 135b. The centers of the first through third signal separation structures 133, 135, and 137 may also be respectively offset from the centers of the first through third pixel regions PG1, PG2, PB, and PR.

In an implementation, the first signal separation structure 133 may be at different distances in the second direction D2 from each of the first pixel isolators 120a. In an implementation, the first signal separation structure 133 may be at different distances in the first direction D1 from each of the second pixel isolators 120b.

In an implementation, as illustrated in FIGS. 11A and 11B, the micro lenses 330 provided in correspondence to each of the pixel regions PG1, PG2, PB, and PR may also be shifted toward the center region (CR of FIG. 2) of the pixel array region (R1 in FIG. 2), in a plan view. In an implementation, a center mc of the micro lens 330 may be offset from the center $PO_1$ of the first pixel regions PG1 and PG2, and the center $PO_2$ of the second pixel region PB, in a plan view. In an implementation, the center mc of the micro lens 330 may also be offset from the center C1 of the first signal separation structure 133, in a plan view.

In an implementation, as illustrated in FIG. 11B, a horizontal distance between the center mc of the micro lens 330 and the centers $PC_1$ and $PC_2$ of each pixel region PG1, PG2, PB, and PR may be substantially the same as a horizontal distance between the center c1 of the first signal separation structure 133 and the centers $PC_1$ and $PC_2$ of the first pixel regions PG1 and PG2, respectively. In an implementation, the horizontal distance between the center mc of the micro lens 330 and the centers $PC_1$ and $PC_2$ of each pixel region PG1, PG2, PB, and PR may be substantially different from the horizontal distance between the center c1 of the first signal separation structure 133 and the center $PC_1$ of the first pixel regions PG1 and PG2.

Figure 12:
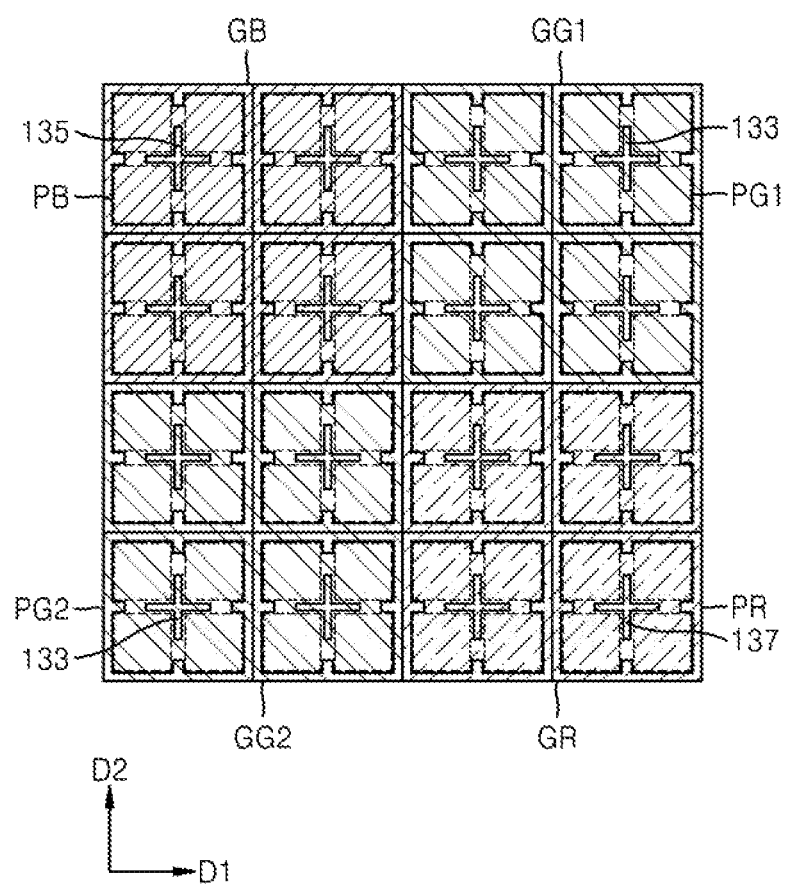
FIG. 12 is a plan view of an active pixel sensor array of an image sensor, according to an embodiment.

FIG. 12 is a plan view of an active pixel sensor array of an image sensor, according to an embodiment.

Referring to FIG. 12, the substrate 100 may include pixel group regions GG1, GG2, GB, and GR. The pixel group regions GG1, GG2, GB, and GR may include first pixel group regions GG1 and GG2, second pixel group region GB, and third pixel group region GR. The first pixel group regions GG1 and GG2 may be arranged in a diagonal direction to each other. The first pixel group regions GG1 and GG2 may include the first pixel regions PG1 and PG2. The first pixel regions PG1 and PG2 may include the first right pixel region PG1 and the first left pixel region PG2. The first pixel group regions GG1 and GG2 may include the first pixel group region GG1 on the right side and the second pixel group region GG2 on the left side. The pixel regions PG1, PG2, PB, and PR included in one pixel group region GG1, GG2, GB, and GR may be arranged in n rows and m columns. In an implementation, each of the n and the m may independently be a natural number of 2 or more. In an implementation, the first pixel group region GG1 on the right side may include four first pixel regions PG1 on the right side arranged in two rows and two columns (2×2). The first pixel group region GG2 on the left side may include four first pixel regions PG2 on the left side arranged in two rows and two columns (2×2). The second pixel group region GB may include four second pixel regions PB arranged in two row and two columns (2×2). The third pixel group region GR may include four third pixel regions PR arranged in two row and two columns (2×2). FIG. 12 illustrates an image sensor having a tetra array structure.

Light beams having different wavelength bands may be incident on each of the first through third pixel regions PG1, PG2, PB, and PR. A light beam of a first wavelength band may be incident on the first pixel regions PG1 and PG2, and a light beam of a second wavelength band that is less than the first wavelength band may be incident on the second pixel region PB. A light beam of a third wavelength band that is longer than the first wavelength band may be incident on the third pixel region PR. In an implementation, the green light may be incident on the first pixel regions PG1 and PG2, the red light may be incident on the second pixel region PB, and the blue light may be incident on the third pixel region PR.

The first pixel group regions GG1 and GG2 may correspond to a group of first pixel regions PG1 and PG2 for sensing light having the first wavelength band. In an implementation, the green color filters 320G may be arranged in all of the first pixel regions PG1 and PG2 belonging to the first pixel group regions GG1 and GG2. The second pixel group region GB may correspond to a group of the second pixel regions PB for sensing light having the second wavelength band. For example, the blue color filters 320B may be arranged in all of the second pixel regions PB belonging to the second pixel group region GB. The third pixel group region GR may correspond to a group of the third pixel regions PB for sensing light having the third wavelength band. For example, the blue color filters 320R may be arranged in all of the third pixel regions PR belonging to the third pixel group region GR.

The first signal separation structure 133 may be in each of the first pixel regions PG1 and PG2 respectively belonging to the first pixel group regions GG1 and GG2. The second signal separation structure 135 may be in each of the second pixel regions PB belonging to the second pixel group regions GB. The third signal separation structure 137 may be in each of the third pixel regions PR respectively belonging to the third pixel group regions GB. In a plan view, the first through third signal separation structures 133, 135, and 137 may include the first isolators 133a, 135a, and 137a extending in the second direction D2, and the second isolators 133b, 135b, and 137b extending in the first direction D1 and crossing the first through third signal separation structures 133, 135, and 137. The first through third signal separation structures 133, 135, and 137 may have a cross-shape, in a plan view. In an implementation, the first through third signal separation structures 133, 135, and 137 may have various shapes as described above, and may also have different shapes from each other. The first through third signal separation structures 133, 135, and 137 may be spaced apart from the pixel isolation structure 120.

The first through third signal separation structures 133, 135, and 137 may include an insulating material having different refractive index from, e.g., the substrate 100 (e.g., silicon). The first through third signal separation structures 133, 135, and 137 may include, e.g., a silicon oxide layer, a silicon nitride layer, an undoped polysilicon layer, air, or a combination thereof.

In an implementation, the active pixel sensor array of the image sensor may have a nona array structure. The first pixel group region GG1 on the right side may include nine first pixel regions PG1 on the right side arranged in three rows and three columns (3×3). The first pixel group region GG2 on the left side may include nine first pixel regions PG2 on the left side arranged in three rows and three columns (3×3). The second pixel group region GB may include nine second pixel regions PB arranged in three rows and three columns (3×3). The third pixel group region GR may include nine third pixel regions PR arranged in three rows and three columns (3×3). The first through third separation structures 133, 135, and 137 may be arranged in each of the first through third pixel regions PG1, PG2, PB, and PR belonging to the first pixel group regions GG1 and GG2. Other structures may be the same as/similar to those described with reference to FIG. 12.

In an implementation, the active pixel sensor array of the image sensor may have a hexadeca array structure. The first pixel group region GG1 on the right side may include sixteen first pixel regions PG1 on the right side arranged in four rows and four columns (4×4). The first pixel group region GG2 on the right side may include sixteen first pixel regions PG2 on the right side arranged in four rows and four columns (4×4). The second pixel group region GB may include sixteen second pixel regions PB arranged in four rows and four columns (4×4). The third pixel group region GR may include sixteen third pixel regions PR arranged in four rows and four columns (4×4). Other structures may be the same as/similar to those described with reference to FIG. 12.

By way of summation and review, as the size of the pixels decreases, crosstalk between the pixels could increase and at the same time, sensor defects could occur in the image sensor. Some pixels of the image sensor may be used as pixels for auto focusing. A camera using the image sensor including pixels for auto focusing may adjust a position of a lens by using signals, which are output by auto focusing pixels in a plurality of photoelectric conversion regions.

One or more embodiments may provide an image sensor capable of performing an auto focusing (AF) operation.

One or more embodiments may provide an image sensor capable of reducing crosstalk between pixels and in addition, sensor defects.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
a substrate including a first surface and a second surface facing each other;
a pixel isolation structure penetrating the substrate, arranged in a pixel isolation trench extending from the first surface to the second surface of the substrate, and defining a pixel region;
a plurality of sub pixel regions on the pixel region;
a plurality of photoelectric conversion regions on the plurality of sub pixel regions;
a signal separation structure between the plurality of sub pixel regions, the signal separation structure being in a signal separation trench extending from the second surface of the substrate toward the first surface of the substrate into the substrate;
a micro lens on the second surface of the substrate, the micro lens corresponding to the pixel region; and
an element isolation pattern on the first surface of the substrate,
wherein the signal separation structure includes an insulating layer,
wherein the pixel isolation structure includes:
a conductive layer;
a capping layer adjacent to the first surface of the substrate in the pixel isolation trench; and
a liner layer between the conductive layer and the substrate, wherein the pixel isolation structure has a first depth from the second surface of the substrate, and penetrates the element isolation pattern, and wherein the signal separation structure has a second depth from the second surface of the substrate, the second depth being less than the first depth.

2. The image sensor as claimed in claim 1,
wherein the signal separation structure does not include the conductive layer.

3. The image sensor as claimed in claim 1,
wherein the signal separation structure includes a silicon oxide layer, a silicon nitride layer, an undoped polysilicon layer, or air.

4. An image sensor, comprising:
a substrate including a first surface and a second surface;
a pixel isolation structure in a pixel isolation trench that penetrates the substrate, the pixel isolation structure defining pixel regions and, in a plan view, surrounding each of the pixel regions;
a plurality of sub pixel regions on the pixel regions;
a plurality of photoelectric conversion regions respectively on the plurality of sub pixel regions;
a signal separation structure between the plurality of sub pixel regions on the pixel regions, the signal separation structure being in the pixel isolation trench extending from the second surface of the substrate into the substrate;
a micro lens on the second surface of the substrate, the micro lens corresponding to the pixel regions; and
an element isolation pattern on the first surface of the substrate,
wherein the pixel isolation structure includes:
first pixel isolators apart from each other and extending in a first direction in parallel with the first surface of the substrate, and
second pixel isolators respectively crossing the first pixel isolators, spaced apart from each other, and extending in a second direction in parallel with the first surface of the substrate and perpendicular to the first direction,
wherein the first pixel isolators include first protrusions protruding toward respective centers of the pixel regions,
wherein the first protrusions face the second direction and are spaced apart from each other,
wherein the pixel isolation structure includes:
a conductive layer,
a capping layer adjacent to the first surface of the substrate in the pixel isolation trench, and
a liner layer between the conductive layer and the substrate,
wherein the signal separation structure includes an insulating layer,
wherein the signal separation structure is spaced apart from the pixel isolation structure,
wherein the signal separation structure has a bar shape extending in the first direction,
wherein the pixel isolation structure has a first width, and penetrates the element isolation pattern, and
wherein the signal separation structure has a second width less than the first width.

5. The image sensor as claimed in claim 4, wherein the signal separation structure does not include the conductive layer.

6. The image sensor as claimed in claim 4,
wherein the signal separation structure includes a silicon oxide layer, a silicon nitride layer, an undoped polysilicon layer, or air.

7. The image sensor as claimed in claim 4,
wherein the signal separation structure includes:
a first isolator extending in the first direction; and
a second isolator crossing the first isolator and extending in the second direction.

8. The image sensor as claimed in claim 7,
wherein, in a plan view, the signal separation structure has a cross shape.

9. The image sensor as claimed in claim 4, wherein:
the plurality of sub pixel regions comprise a first sub pixel region, a second sub pixel region, a third sub pixel region, and a fourth sub pixel region, and
the first sub pixel region, the second sub pixel region, the third sub pixel region, and the fourth sub pixel region are arranged in two rows and two columns.

10. The image sensor as claimed in claim 4,
wherein the plurality of sub pixel regions includes a first sub pixel region and a second sub pixel region.

11. The image sensor as claimed in claim 4,
wherein the signal separation structure, in a plan view, overlaps portions of the plurality of sub pixel regions.

12. The image sensor as claimed in claim 4, wherein:
the second pixel isolators include second protrusions protruding toward the respective centers of the pixel regions, and
the second protrusions face the first direction and are spaced apart from each other.

13. The image sensor as claimed in claim 4, wherein:
the pixel isolation structure has a first depth from the second surface of the substrate, and
the signal separation structure has a second depth from the second surface of the substrate, the second depth being less than the first depth.

14. The image sensor as claimed in claim 4,
wherein a center of the signal separation structure is, in a plan view, offset from a center of the pixel regions.

15. The image sensor as claimed in claim 4,
wherein a center of the micro lens is, in a plan view, offset from the center of the pixel regions.

16. An image sensor, comprising:
a substrate including a first surface and a second surface, the substrate including first pixel group regions and second pixel group regions, the first pixel group regions being arranged in n rows and m columns and including first pixel regions for sensing a first light, the second pixel group regions being arranged in n rows and m columns and including second pixel regions, and each of the n and the m independently being a natural number of 2 or more;
a pixel isolation structure in a pixel isolation trench penetrating the substrate, the pixel isolation structure isolating a plurality of pixel regions;
a plurality of sub pixel regions in the substrate and on each pixel region of the plurality of pixel regions;
a plurality of photoelectric conversion regions on each sub pixel region of the plurality of sub pixel regions;
a signal separation structure between the plurality of sub pixel regions, the signal separation structure being arranged in the pixel isolation trench extending from the second surface of the substrate into the substrate;
micro lenses respectively on the second surface of the substrate and on the plurality of pixel regions; and
an element isolation pattern on the first surface of the substrate,
wherein the signal separation structure includes an insulating layer, wherein the pixel isolation structure includes protrusions protruding in a direction vertical to the pixel isolation structure toward respective centers of the plurality of pixel regions,
wherein the pixel isolation structure includes:
a conductive layer; and
a liner layer between the conductive layer and the substrate,
wherein the signal separation structure is spaced apart from the pixel isolation structure, and
wherein the pixel isolation structure penetrates the element isolation pattern.

* * * * *